(12) United States Patent
Khadem et al.

(10) Patent No.: US 12,360,213 B2
(45) Date of Patent: Jul. 15, 2025

(54) SEMANTIC SEGMENTATION OF AGGREGATED SENSOR DATA

(71) Applicant: Zoox, Inc., Foster City, CA (US)

(72) Inventors: Soroush Dean Khadem, San Francisco, CA (US); Derek Xiang Ma, San Carlos, CA (US)

(73) Assignee: Zoox, Inc., Foster City, CA (US)

( * ) Notice: Subject to any disclaimer, the term of this patent is extended or adjusted under 35 U.S.C. 154(b) by 357 days.

(21) Appl. No.: 17/965,686

(22) Filed: Oct. 13, 2022

(65) Prior Publication Data

US 2024/0125899 A1 Apr. 18, 2024

(51) Int. Cl.
| | | |
|---|---|---|
| *G01S 7/48* | (2006.01) | |
| *G01S 17/89* | (2020.01) | |
| *G01S 17/931* | (2020.01) | |
| *G06V 10/82* | (2022.01) | |
| *G06V 20/10* | (2022.01) | |

(52) U.S. Cl.
CPC ............ *G01S 7/4802* (2013.01); *G01S 17/89* (2013.01); *G01S 17/931* (2020.01); *G06V 10/82* (2022.01); *G06V 20/182* (2022.01)

(58) Field of Classification Search
CPC ...... G01S 7/4802; G01S 17/931; G01S 17/89; G06V 20/182; G06V 20/588; G06V 10/82
See application file for complete search history.

(56) References Cited

U.S. PATENT DOCUMENTS

| | | |
|---|---|---|
| 10,203,210 B1 | 2/2019 | Tagawa |
| 11,061,398 B2 * | 7/2021 | Levinson ............... B60Q 1/503 |
| 11,409,304 B1 * | 8/2022 | Cai .......................... B60R 1/00 |
| 2020/0200907 A1 | 6/2020 | Li |
| 2022/0076030 A1 | 3/2022 | Anguelov |
| 2022/0146277 A1 | 5/2022 | Lambert |

OTHER PUBLICATIONS

The PCT Search Report and Written Opinion mailed on Feb. 13, 2024, for PCT Application No. PCT/US2023/035027 from PCT Summary 12 pages.

* cited by examiner

*Primary Examiner* — An H Do
(74) *Attorney, Agent, or Firm* — Lee & Hayes, P.C.

(57) ABSTRACT

Techniques for segmenting and classifying a representation of aggregated sensor data from a scene are discussed herein. Sensor data may be collected during multiple traversals of a same scene, and the sensor data may be filtered to remove portions of the sensor data not relevant to road network maps. In some examples, the filtered data may be aggregated and represented in voxels of a three-dimensional voxel space, from which an image representing a top-down view of the scene may be generated, though other views are also contemplated. Operations may include segmenting and/or classifying the image e.g., by a trained machine-learned model, to associate class labels indicative of map elements (e.g., driving lane, stop line, turn lane, and the like) with segments identified in the image. Additionally, techniques may create or update road network maps based on segmented and semantically labeled image(s) of various portions of an environment.

20 Claims, 5 Drawing Sheets

SEMANTIC SEGMENTATION OF AGGREGATED SENSOR DATA

BACKGROUND

Autonomous vehicles often use maps of roadways for navigating within an environment. The maps may indicate semantic map elements such as roads, lanes, sidewalks, parking spots, crosswalks, etc. However, initial creation of such maps, as well as maintenance of the maps to keep them up-to-date by incorporating changes in the environment, may require significant resources and manual input. Further, presence of irrelevant elements in sensor data may result in inaccurate segmentation and classification of map elements relevant to the road network maps of the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
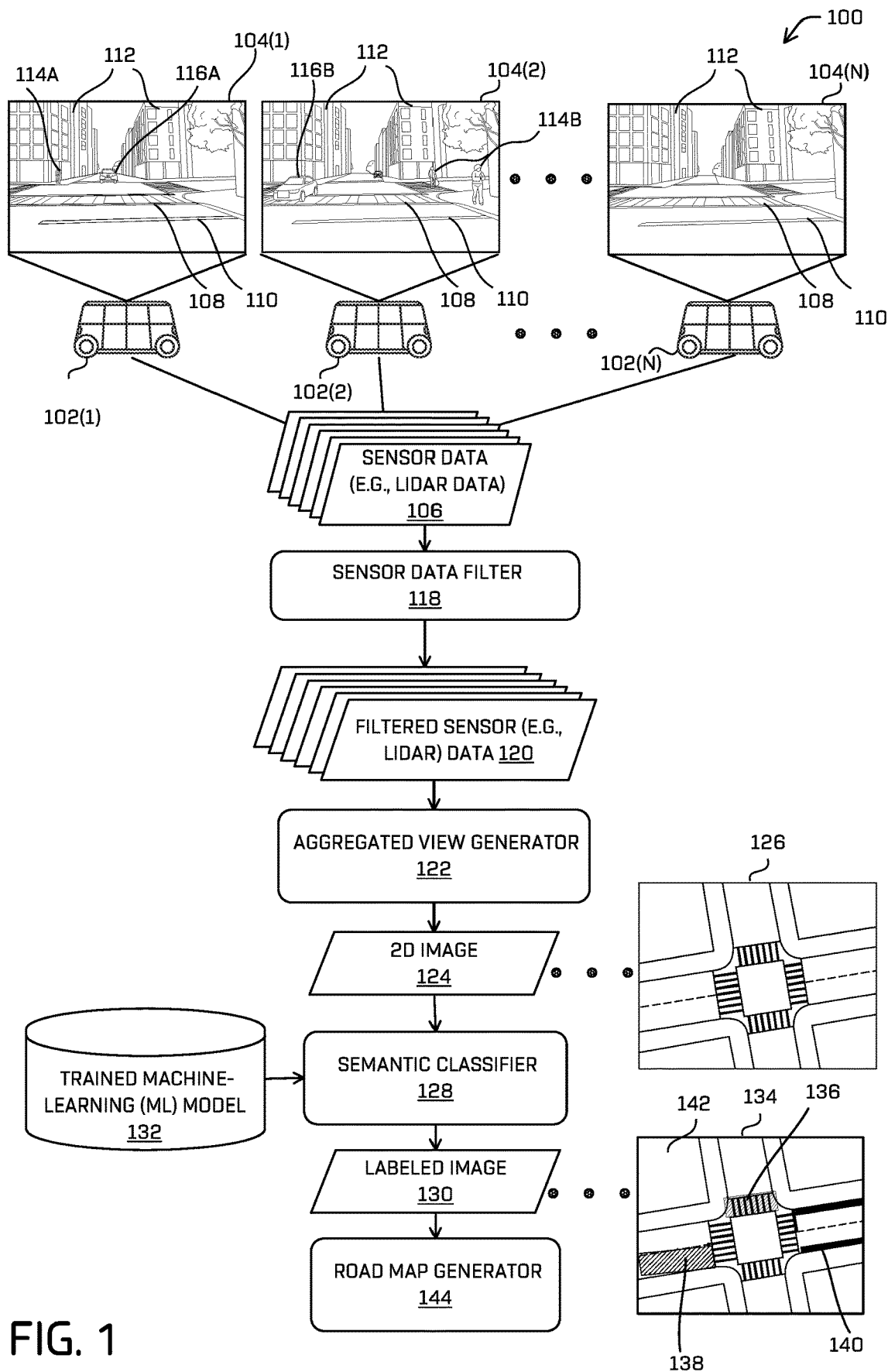
FIG. 1 is a schematic diagram illustrating an example process for generating semantically labeled road network maps, according to examples of the disclosure.

Techniques described herein are directed to generating and updating semantically labeled road network maps, based on semantic segmentation of sensor data. In examples, road network maps may include map elements associated with a drivable surface and/or ground plane of an environment, indicating both a semantic label associated with the map element and a spatial extent of the map element. For example, the map elements can include lane elements to indicate an extent of a lane or driving corridor, stop line elements to indicate a stop line at an intersection, crosswalk elements to indicate areas of pedestrian crossing, and the like. Additional, non-limiting examples of map elements may include a bike lane element, a parking spot element, an intersection element, a lane divider element, a yield line element, and the like. As can be understood, such road network maps can be used to plan a route or generate a trajectory for an autonomous vehicle to traverse the environment.

In examples described herein, sensor data associated with a same portion of the environment or scene may be captured by one or more vehicles during multiple traversals of the environment, (e.g., within a geo-fenced area or on routes within an area of operation of autonomous vehicles). For example, sensors mounted on the vehicle(s) may capture sensor data of the same portion of the environment or the scene as the vehicle(s) traverse the environment at different times. In examples, the sensor data may comprise data captured by different vehicles or a same vehicle at different times (e.g., during different trips). The sensor data may be associated with the portion of the environment or scene based on a known location and/or trajectory of the vehicle(s) when the sensor data was captured. This disclosure is generally directed to a system configured to receive the sensor data representing the environment, and generating a semantically labeled, segmented output suitable for creating and updating road network maps. However, other applications of the output are also contemplated (e.g., for path planning, obstacle avoidance and fleet operations in the context of autonomous vehicle operations).

Although mapping and navigation systems using various sensor modalities (e.g., radar or 4D radar, range camera, stereo cameras, time-of-flight sensors, etc.) may benefit from the techniques described herein, an example system that implements the techniques described herein may use LiDAR data as the sensor data to interpret the environment. For example, the LiDAR data may be captured by vehicle(s) equipped with one or more LiDAR sensors, each configured to generate LiDAR returns about a 360-degree field of view around the vehicle(s). Any combination of any sensor information may be used. Generally, LiDAR returns can include both position information and intensity information. For instance, the position information can include a distance (e.g., depth or range from the sensor) and an azimuth (e.g., an angle from a reference line or position). In some examples, a scanning LiDAR sensor may rotate (e.g., about a vertically-oriented axis), to scan the full 360-degree field about the sensor, though other forms of lidar (including flash lidar, solid state lidar, etc.) are contemplated. The LiDAR data may comprise a high-resolution point cloud of the environment, comprising three-dimensional (3D) data points along with associated information, such as intensity information, signal-to-noise ratio, velocity information, and the like.

In some examples, the techniques described herein may filter the LiDAR data to remove returns that are not relevant to road network maps. For example, LiDAR returns from surfaces higher than a vertical distance threshold from a ground plane may be filtered out, leaving only LiDAR data related to features near or on the ground plane. In some examples, the ground plane may be determined using one or more techniques described in U.S. Pat. No. 10,444,759, issued on Oct. 15, 2019, titled "Voxel based Ground Plane Estimation and Object Segmentation," and U.S. patent application Ser. No. 16/698,055, filed on Nov. 27, 2019, titled "Height Estimation using Sensor Data," the entire contents of both of which are incorporated by reference herein for all purposes. In some instances, the vertical distance may be specified relative to an origin or a virtual origin of a LiDAR system collecting the LiDAR data. In addition, transient elements (e.g., vehicles, pedestrians, construction equipment etc.) may be identified and removed from the LiDAR data, so that the remaining LiDAR data primarily corresponds to time-invariant elements of the environment. In some examples, object tracking may be used to identify transient vs static objects using techniques such as described in U.S. patent application Ser. No. 16/866,865, filed May 5, 2020, titled "Object Velocity and/or Yaw Rate Detection and Tracking," and U.S. patent application Ser. No. 17/364,603, filed Jun. 30, 2021, titled "Tracking Objects with Radar Data," the entirety of both of which are hereby incorporated by reference for all purposes. In some examples, sensor data associated with low confidence scores may also be removed. For example, LiDAR data may include a confidence score associated with individual or groups of data points indicative of an accuracy of the data, which may be based on signal-to-noise ratio (e.g., data points with low SNR may result in a correspondingly low confidence score), and/or sensor performance (e.g., environmental conditions such as adverse weather conditions may affect sensor performance).

In examples described herein, LiDAR data captured by the vehicle(s) at different times and/or during different trips, and associated with the same portion of the environment or scene, may be agglomerated into a common scene representation. Various techniques may be used to aggregate points in individual instances of the LiDAR data into the common scene representation. For example, aggregated LiDAR data associated with the same scene may be mapped to cells of a three-dimensional (3D) volume element ("voxel") space representing a physical volume of the scene. In the voxel space, each cell or voxel may be associated with cell data representing a statistical accumulation of the LiDAR data corresponding to returns from a physical volume in the scene represented by the cell or voxel. In some examples, the cell data may include an average intensity, a number of returns, an average x-value, an average y-value, an average z-value, and/or a covariance matrix based on the LiDAR data.

In examples, techniques described herein may generate a two-dimensional (2D) image representing a top-down perspective or plan view of the 3D voxel space. In particular, the 2D image may represent an average intensity value and/or a weighted mean intensity value weighted by a number of data points. As can be understood, LiDAR returns corresponding to time-invariant features of the scene are expected to occur in a large proportion of instances in the LiDAR data, resulting in higher values of the weighted mean intensity or the average intensity. Correspondingly, LiDAR returns representing transient elements in the scene are expected to occur in a small proportion of the instances in the LiDAR data, resulting in low intensity values in the 2D image. Thus, the 2D image effectively represents the voxel space as viewed from above and emphasizes time-invariant features of the scene. In addition, the 2D image generated from aggregated LiDAR data that has been filtered to remove data from surfaces higher than a vertical distance threshold from the ground plane, as described above, captures time-invariant features at or near the ground plane, which are most relevant for road network maps. Such a 2D image may be subsequently input into a trained machine-learned (ML) model to receive an output comprising pixel classification and/or segmentation data associated with the 2D image.

Implementations of this disclosure may maintain a previously-trained ML model for classifying pixels of images depicting top-down views of road networks. The ML model may be trained using training data comprising images of top-down views of road networks where pixels have been labeled with a class label from among a specified set of class labels. The labeling of the training data may be manual, auto-generated followed by human verification, or provided by a third-party map provider. The specified set of class labels may include class labels relevant to a road network, corresponding to the map elements discussed above (e.g., "lane of road," "bike lane," "left turn lane," "sidewalk," "crosswalk," and the like). The specified set of class labels may also include other commonly-encountered elements such as "building," "vegetation," "water body," and the like, as well as a catch-all class label (e.g., "other" or "background") that is used to label pixels not falling into one of the other classes of the set of class labels.

The techniques discussed herein may include providing the 2D image representing a top-down view as an input image to a trained ML model, and receiving, from the ML model, an output indicating classification associated with individual "pixels" of the input image, where the "pixels" may also represent groups of neighboring data points. The classification may include a class label associated with a pixel and a confidence score indicative of a level of certainty of the class label. As a non-limiting example, the trained ML model may comprise a fully convolutional network (FCN), which returns an output of the same size as the input image, where the output at coordinates (x, y) includes class label(s) and pixel-level confidence score(s) (or class label probabilities) associated with a pixel at coordinates (x, y) of the input image. Whereas traditional machine learning classifiers may output a global class label given an input image, the output produced by an FCN provides an additional advantage of localization of the class labels, since the class labels are associated with individual pixels which are located at known (x, y) coordinates within an image.

In some examples of the system described herein, a segmented output image may be generated from the output (e.g., as generated by an FCN) by clustering spatially contiguous pixels with a same class label (e.g., by using connected-component analysis techniques known in the art). In such examples, a segment-level confidence score for each segment may be computed based on the pixel-level confidence scores obtained as output from the ML model. For example, the segment-level confidence score may be an average value or a median value of the pixel-level confidence scores of the pixels in the segment. The segmented output image may indicate spatial extents of segment(s) (e.g., using a bounding box for 2D elements, or a spline for linear elements), class label(s) associated with individual segment(s) and/or the corresponding segment-level confidence score(s).

In other examples, the 2D image representing the top-down view may be segmented first using image segmentation techniques known in the art. Subsequently, machine learning techniques such as deep convolutional neural networks (CNNs), conditional random fields (CRFs), rule-based systems, probabilistic frameworks, and the like, that output a global class label (instead of pixel-level class labels provided by FCNs), may be applied to individual segments to receive a class label and a confidence score (or class probability) as an output. In this example, the segmented image, with individual segments associated with a class label and confidence score, is analogous to the segmented output image generated by the application of a trained ML model, such as an FCN, followed by clustering similarly-labeled pixels to generate segments, as described above.

The techniques discussed herein can improve a functioning of a computing device in a number of ways. For example, in previous techniques, an initial task of associating a class label corresponding to a map element with three-dimensional sensor data (e.g., LiDAR data) captured by sensors of a vehicle may need to be performed manually by cartographers or skilled technicians. Previous techniques may also involve the cartographer or skilled technician manually updating road network maps in response to updated sensor data indicating change(s), which may require several hours to several weeks of work, depending on the size of the environment represented by the road network maps. The techniques discussed herein can automate such map creation and updating operations, thereby significantly reducing processing and time required to maintain a road network map needed for operation of autonomous vehicles in an environment.

As an example, in some applications of the techniques described herein, the segmented output image may be used for creating and/or updating road network maps in the context of a vehicle, such as an autonomous vehicle. For example, during an initial creation of a road network map (e.g., for a new environment that the autonomous vehicle needs to traverse), a set of sensor data collected by one or more vehicles, which may or may not be operating in an autonomous mode, may be automatically processed using the techniques described herein, to generate a segmented output image with class labels corresponding to map elements, as described above. As also described above, the segments may be associated with segment-level confidence scores. In examples, if a segment-level confidence score is equal to or greater than a minimum threshold, the class label associated with the segment, and a spatial extent of the segment may be transferred to a newly-created road network map. However, if the segment-level confidence score is less than the minimum threshold, the segment may be flagged for further inspection (e.g., by a human operator), to determine its class label and/or extent. Alternatively, or in addition, the segments may be compared with data from third-party map providers to determine correspondences between the segments and map elements in the third-party map data. When a match is determined, the segment may be added to the new road network map, and if a mismatch is determined, the segment may be flagged for human verification.

In another example, the system described herein may generate the segmented output image from a set of sensor data collected at regular intervals or when a change is expected (e.g., due to known construction work, traffic flow changes etc.). The system may compare class labels and spatial extents of segments of the segmented output image with an existing road network map. In an instance where the system determines a difference between the class labels and/or spatial extents of one or more segments of the segmented output image and the existing road network map, differing segment(s) that have a segment-level confidence score equal to or greater than the minimum threshold may be automatically updated in the road network map. Whereas, differing segments with a segment-level confidence score less than the minimum threshold may be referred for further inspection (e.g., verification by a human operator). Thus, road network maps may be maintained or kept up-to-date using the techniques described herein.

The techniques described herein can be implemented in a number of ways. Example implementations are provided below with reference to the following figures, FIGS. 1-5. Although discussed in the context of an autonomous vehicle, the methods, apparatuses, and systems described herein can be applied to a variety of systems (e.g., a sensor system or a robotic platform), and is not limited to autonomous vehicles. In another example, the techniques can be utilized in an aviation or nautical context, or in any system using maps. Further, although discussed in the context of LiDAR data, sensor data can include any two-dimensional, three-dimensional, or multi-dimensional data such as image data (e.g., stereo cameras, time-of-flight data, and the like)), RADAR data, SONAR data, and the like. Additionally, the techniques described herein can be used with real data (e.g., captured using sensor(s)), simulated data (e.g., generated by a simulator), or any combination of the two.

FIG. 1 is a schematic diagram illustrating an example process 100 for generating semantically-labeled road network maps of an environment. As shown in FIG. 1, vehicles 102(1), 102(2), . . . , 102(N) (collectively, the vehicles 102) may traverse a same portion of the environment or a scene 104 capturing a set of sensor data (e.g., LiDAR data) 106 representing the scene 104, using sensors (not shown) mounted on the vehicles. In examples, the scene 104 is associated with a known location (e.g., point and heading on a map, latitude and longitude with a heading direction, or the like) and sensor data representative of the scene 104 is recorded at a particular instant in time. For example, the first vehicle 102(1) may traverse the scene 104 at a first time and/or during a first trip, as shown in 104(1), the second vehicle 102(2) may traverse the same scene 104 at a second time and/or during a second trip, as shown in 104(2), and the $N^{th}$ vehicle 102(N) may traverse the same scene 104 at a $N^{th}$ time and/or during a $N^{th}$ trip, as shown in 104(N). In examples, the different times may include different times of day, including night-time, and/or during different weather conditions. The vehicles 102 may be the same vehicle (e.g., traversing the scene 104 at different times) or different vehicles, e.g., mounted with similar sensor configurations. Moreover, the vehicles 102 may each be operating in an autonomous mode, or being driven by a human driver, during traversal of the environment for collecting the sensor data 106.

As shown in FIG. 1, the scene 104 may present a number of permanent or time-invariant road map elements, such as pedestrian crosswalk(s) 108 and stop line(s) 110, in addition to time-invariant background features, such as buildings 112. Other non-limiting examples of time-invariant road map elements may include driving lane(s), bike lane(s), parking spot(s), turn lane(s), intersection(s), lane divider(s), median(s), yield line(s) and the like. Road map elements may typically be characterized by highly reflective markings applied to a drivable surface. Similarly, other examples of time-invariant background features may also include trees, telephone/power line poles, sign boards, and the like. The scene 104 may also present different transient elements at different times, such as a pedestrian 114A and a vehicle 116A at 104(1), and a pedestrian 114B and a vehicle 116B at 104(2). The sensor data 106 collected by the vehicles 102 during multiple traversals of the scene 104 (e.g., during different trips) include both time-invariant features, including road map elements and background, and transient features of the scene. Of course, though described herein as being permanent or time-invariant, such features may change (e.g., by moving their location, construction, growth, etc.) and the techniques described herein may ensure that such changes are reflected in datasets (e.g., maps) which are relied upon for safe navigation through an environment.

The vehicles 102 may include a plurality of sensors of different modalities (e.g., radar or 4D radar, range camera, stereo cameras, time-of-flight sensors, etc.). In an example implementation, the vehicles 102 may capture the set of sensor data (e.g., LiDAR data) 106 using LiDAR sensors of the vehicle, as described in further detail with reference to FIG. 2. The LiDAR data 106 may comprise high-resolution point clouds of the environment, comprising three-dimensional (3D) data points along with associated information, such as intensity information, signal-to-noise ratio, velocity information, and the like. The LiDAR data 106 may be represented as points in a three-dimensional voxel space, as a three-dimensional mesh (or other representations, models, etc.). In implementations, the set of LiDAR data 106 may represent a 360-degrees field of view, where the scene 104 may represent only a portion of an entire field of view.

As shown in FIG. 1, the example process 100 may include a sensor data filter 118 configured to receive the set of LiDAR data 106, determine portions of the set of LiDAR data 106 that are relevant to the generation of road network maps, and output a corresponding set of filtered sensor data 120. For example, LiDAR returns from surfaces higher than a vertical distance threshold from a ground plane may be filtered out, so that the set of filtered LiDAR data 120 comprises LiDAR data related to features near or on the ground plane, as described in further detail with reference to FIG. 2. As can be understood, the filtered LiDAR data 120 retains features at or near the ground plane, which are most relevant to road network maps. In some examples, the sensor data filter 118 may also identify transient elements (e.g., vehicles, pedestrians, construction equipment etc.) in the set of LiDAR data 106, and remove data associated with the identified transient elements, so that the filtered LiDAR data 120 primarily correspond to time-invariant elements of the environment. Further details of functionality implemented by the sensor data filter 118 will be discussed with reference to FIG. 2. In some examples, the sensor data filter 118 may be implemented on computing systems of the vehicles 102, and the computing systems of the vehicles 102 may locally store the filtered sensor data 120 and/or transmit the filtered sensor data 120 to external computing systems for further processing.

As shown in FIG. 1, the example process 100 may also include an aggregated view generator 122. In examples, individual instances of LiDAR data of the set of filtered LiDAR data 120 may be represented as a set of 3D data points in an associated 3D voxel space. Accordingly, the set of filtered LiDAR data 120 may be associated with a corresponding set of 3D voxel spaces. The aggregated view generator 122 may implement functionality to align the set of 3D voxel spaces so that sets of 3D data points from individual instances of the set of filtered LiDAR data 120 may be mapped to cells of a common three-dimensional voxel space representing a physical volume of the scene 104. The set of 3D voxel spaces may be aligned by using location and/or trajectory information of the vehicle(s) 102 at a time of capture of the corresponding LiDAR data. As an example, the aggregated view generator 122 may align the set of 3D voxel spaces using techniques described in U.S. Pat. No. 10,983,199 issued on Apr. 20, 2021, titled "Vehicle Sensor Calibration and Localization," which describes algorithms for recognizing previously-visited location(s) and continuously determining a location and/or orientation of a vehicle within a map, and U.S. Pat. No. 10,782,136 issued on Sep. 22, 2020, titled "Modifying Map Elements associated with Map Data," which describes algorithms for aligning sensor data gathered while traversing same location(s) while following different trajectories, both of which are hereby incorporated by reference in their entirety and for all purposes. In some instances, margins of individual voxel spaces may be padded (e.g., with null or baseline data) to align with the common 3D voxel space (e.g., when there is imperfect overlap between an individual voxel space and the common 3D voxel space).

As can be understood, LiDAR returns from time-invariant features of the scene 104 are expected to occur in a large proportion of instances from the set of filtered LiDAR data 120. Additionally, data points associated with the time-invariant features would be mapped to the same voxel(s) of the common 3D voxel space after alignment. In the common 3D voxel space, each cell or voxel may be associated with cell data representing a statistical accumulation of the set of filtered LiDAR data 120, corresponding to returns from a physical volume in the scene 104 represented by the cell or voxel. In some examples, the cell data may include an average intensity, a number of returns, an average x-value, an average y-value, an average z-value, and/or a covariance matrix based on the set of filtered LiDAR data 120. In various examples, such data may further include a distribution of semantic classes and/or their relative confidence levels. The common 3D voxel space is described in further detail with reference to FIG. 3.

The aggregated view generator 122 may also include functionality to generate a two-dimensional (2D) image 124 representing a top-down view of the common 3D voxel space populated with data points from the set of filtered LiDAR data 120. For example, pixels of the 2D image 124 may represent a cumulative intensity value, a maximum intensity value, or an average intensity value in a projection of each column of voxels onto a two-dimensional plane (e.g., the ground plane) as illustrated in an example image 126 (which may correspond to a portion of the environment that includes scene 104). In some examples, the 2D image 124 may represent a weighted mean intensity value (e.g., weighted by a total number of data points in the corresponding column of voxels). As described, voxels containing the time-invariant features of the scene 104 may accumulate data points from multiple individual instances of the set of filtered LiDAR data 120, and accordingly, produce higher values of the weighted mean intensity or the average intensity, as illustrated in the example image 126. Whereas, intensity values from transient elements of the scene 104 are unlikely to occur repeatedly at a consistent location or voxel in the common 3D voxel space, resulting in lower values of average or weighted mean intensity. Thus, the 2D image 124 of the common 3D voxel space as viewed from above (e.g., in a top-down view), effectively emphasizes time-invariant features of the scene 104. Additionally, road map elements are typically characterized by high reflectivity, and therefore, would correspond to higher intensity regions in the 2D image 124. Though a top-down view is used in the context of this application, 2D images from other viewpoints, such as a side view, bottom-up, or any arbitrary viewpoint can be generated by the aggregated view generator 122, and subsequent processing may be adapted to the viewpoint(s) used.

As shown in FIG. 1, the example process 100 may include a semantic classifier 128 configured to accept the 2D image 124 as input and output a semantically labeled image 130. In examples, the labeled image 130 may include segment(s) corresponding to map elements of road network maps, indicating both semantic label(s) associated with the segment(s) and a spatial extent of the segment(s). For example, the map elements can include lane elements to indicate an extent of a lane or driving corridor, stop line elements to indicate a stop line at an intersection, crosswalk elements to indicate areas of pedestrian crossing, and the like. Additional, non-limiting examples of map elements may include a bike lane element, a parking spot element, an intersection element, a lane divider element, a yield line element, and the like. In some examples, the semantic label(s) may indicate a map element by name (e.g., "crosswalk" for a crosswalk element).

In examples, implementations of the semantic classifier 128 may comprise a previously-trained machine-learning (ML) model 132 for classifying pixels in images, such as the 2D image 124, with semantic labels corresponding to map elements associated with road network maps. For example, the trained ML model 132 may be previously trained using training data comprising images of top-down views of road networks where pixels have been labeled with a class label (e.g., manually, by class labels provided by a third-party map provider, and/or by auto-generated and human-verified class labels) from among a specified set of class labels. The specified set of class labels may include class labels relevant to a road network, corresponding to the map elements discussed above (e.g., "lane of road," "bike lane," "left turn lane," "sidewalk," "crosswalk," and the like). The specified set of class labels may also include other commonly-encountered elements such as "building," "vegetation," "water body," and the like, as well as a catch-all class label (e.g., "other" or "background") that is used to label pixels not falling into one of the other classes of the set of class labels.

The semantic classifier 128 may provide the 2D image 124, which represents a top-down view associated with the scene 104, as an input image to the trained ML model 132, and receive, from the ML model 132, an output indicating classification associated with individual pixels of the 2D image 124. The classification may include the class label associated with individual pixels and a confidence score indicative of a level of certainty of the class label. For example, a confidence score may be a value between 0 and 1, where 0 represents an indication that the ML model 132 is not at all confident in the class label applied, whereas a confidence score close to 1 indicates strong confidence in the class label applied. In some examples, the classification may instead include a set of probabilities indicating a likelihood that the individual pixel belongs to each of the specified set of class labels. As a non-limiting example, the trained ML model may comprise a fully convolutional network (FCN). As is known in the art, an FCN is a specialized convolutional neural network (CNN) architecture which incorporates multiple up-sampling convolutional layers to a standard CNN, where feature maps from intermediate layers are merged back in during up-sampling (e.g., using "skip connections"). As a result, an FCN generates an output of the same size and resolution as its input image, where the output includes class labels and class label probabilities (which corresponds to the confidence scores) associated with individual pixels. Whereas traditional machine learning classifiers may output a global class label given an input image, the output produced by an FCN provides an additional advantage of localization of the class labels, since the class labels are associated with individual pixels of the input image which are located at known (x, y) coordinates within the input image.

Further, the semantic classifier 128 may determine segments (e.g., groups of contiguous pixels of the same class label), based on the output received from the trained ML model 132 (e.g., a trained FCN). For example, the semantic classifier 128 may cluster spatially contiguous pixels which have a same class label (e.g., by using connected-component analysis) to form the segments. The semantic classifier 128 may also determine, for individual segments of the determined segments, a segment-level confidence score based on the confidence scores, at a pixel-level, outputted by the ML model 132. For example, the segment-level confidence score may be an average value or a median value of the confidence scores associated with the pixels in the segment. The determined segments may be superimposed on the 2D image 124 to generate a labeled image 130, as illustrated by an example labeled image 134, including map data indicating extents of the determined segments and their associated semantic class labels. In the example labeled image 134, segment 136 is associated with a class label of "crosswalk," segment 138 is associated with a class label of "driving lane," and segment 140 is associated with a class label of "parking lane." In addition, each of the segments 136, 138, 140 may also be associated with a confidence score indicating the certainty of the identified class labels, as described above. In some examples, additional class labels, such as area 142 of the example labeled image 134 corresponding to a class label of "building," may also be included in the labeled image 130, to indicate permanent structures of the scene 104 which may not be directly related to the road networks.

In an alternative implementation, the labeled image 130 may be generated by techniques where the ML model 132 is trained to output mask(s) or segments representing objects given a top-down view, such as the 2D image 124, as input. In such examples, the semantic classifier 128 may implement one or more techniques described in U.S. Pat. No. 10,649,459 issued on May 12, 2020, titled "Data Segmentation using Masks," which is incorporated by reference herein in its entirety for all purposes. In still another alternative implementation, the trained ML model 132 may be trained with three-dimensional data (e.g., 3D data points represented in a 3D voxel space), and the 3D voxel space populated with data points from the set of filtered LiDAR data 120 may be directly inputted to such an ML model 132 to determine pixel-level or segment-level classification(s).

As also shown in FIG. 1, the process 100 may include a road map generator 144. The road map generator 144 may comprise functionality to generate a road network map of the environment based on map data and/or labeled images obtained for different portions of the environment, such as the portion shown in the example labeled image 134. The road network map may, for example, be a two-dimensional (2D) or a three-dimensional (3D) representation indicating one or more of a driving lane element, a bike lane element, a parking lane element, a crosswalk element, an intersection element, a lane divider element, a stop line element, a yield sign element, a yield line element, a driveway element, a speed bump element, crosswalk elements, and the like. In some examples, the road network map can be encoded with information indicating an attribute of a particular portion of the road. For instance, a driving lane in the road network map can be encoded with information indicating a speed limit, one-way, parking restrictions, and the like. In at least some instances, the road network map may also include an underlying road mesh comprising 3D tiles on which 2D road network data can be projected. Additional details associated with such road network data 108 and/or the road mesh 110 are described in U.S. Pat. No. 10,699,477 issued on Jun. 30, 2020, titled "Generating Maps without Shadows," and U.S. Pat. No. 11,188,091, issued on Nov. 30, 2021, titled "Mesh Decimation based on Semantic Information," the entire contents of both of which are incorporated by reference herein.

In some examples, the road network map may include the class labels indicated in segments of the labeled image(s) 130, as illustrated in the example labeled image 134, and the spatial extents of the segments, in a common two-dimensional reference frame. For example, during an initial creation of the road network map (e.g., for a new environment that an autonomous vehicle needs to traverse), labeled image(s) 130, such as the example labeled image 134, may be generated based on the sensor data 106 corresponding to different portions of the environment, using techniques described above. In examples, if the segment-level confidence score of a segment is equal to or greater than a minimum confidence threshold, the class label associated with the segment, and a spatial extent of the segment may be transferred to corresponding areas of a newly-created road network map. However, if the segment-level confidence score is less than the minimum confidence threshold, the segment may be flagged for further inspection (e.g., by a human operator), to determine its class label and/or extent. Alternatively, or in addition, the segments may be compared with data from third-party map providers to determine correspondences between the segments and map elements in the third-party map data. When a match is determined, the segment may be added to the new road network map without additional human verification.

The road map generator 144 may also compare the class labels and spatial extent of segments of the labeled image 130 with an existing road network map to determine difference(s) between the class labels and/or spatial extents of one or more segments of the labeled image 130 and the existing road network map. In some examples, the existing road network map(s) may be previously generated (e.g., by applying the process 100 to previously obtained sensor data), and/or obtained from third-party map providers. As a non-limiting example, the difference in spatial extents between two segments of the same class label may be computed as an intersection between the two segments (e.g., number of pixels in an overlapping area) divided by a union of the two segments (e.g., number of pixels in an area covered by the segments in conjunction). For the segment(s) that are different (e.g., having different class labels, and/or differing in spatial extent by an amount higher than a minimum difference threshold), if the segment-level confidence score(s) are equal to or greater than the minimum confidence threshold, the segment(s) may be automatically updated in the road network map by replacing the segment in the existing road network map with the segment from the labeled image 130. Whereas, if the segment-level confidence score(s) are less than the minimum confidence threshold, the differing segment(s) may be referred for further verification (e.g., to a human operator).

The techniques described herein can improve a functioning of a computing device by providing a framework for efficiently creating and updating road network maps for use in autonomous vehicle navigation. For example, the process 100 may be executed when road network maps of a new area are needed, and at regular intervals in areas with existing road network maps to keep the maps up-to-date. The process 100 may also be executed when a change in roadways is expected (e.g., due to known construction work, traffic flow changes etc.). In some instances, road network maps generated by the process 100 can be provided to a planner system to generate a trajectory for an autonomous vehicle to traverse the environment covered by the road network map(s).

Figure 2:
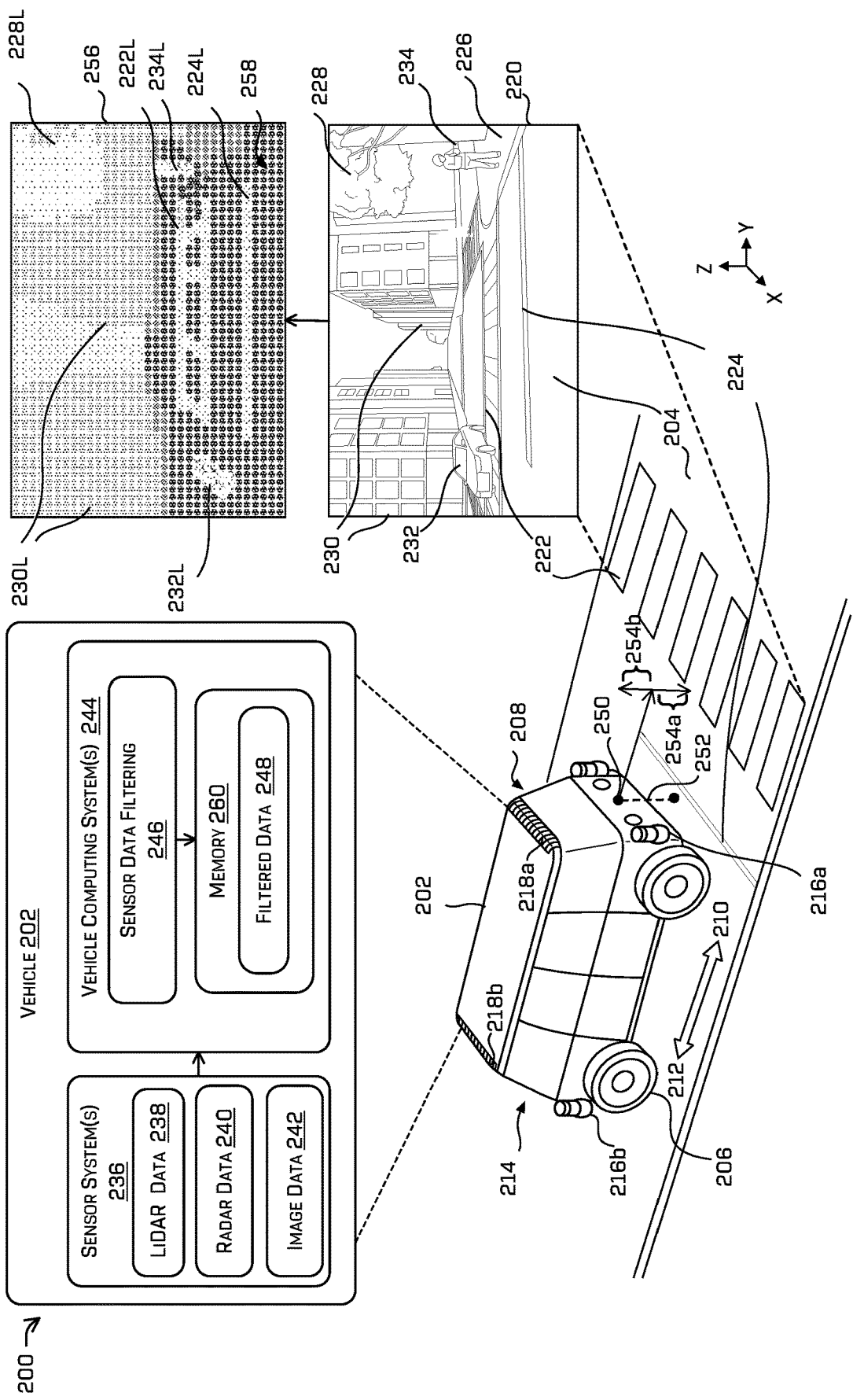
FIG. 2 depicts an example vehicle capturing sensor data of an environment.

FIG. 2 illustrates an example environment 200 through which an example vehicle 202 is traversing while capturing sensor data as described above with reference to FIG. 1. The example environment 200 shows the vehicle 202, which may be an autonomous vehicle and/or one of the vehicles 102 discussed above, driving on a road surface 204. The vehicle 202 is transported by wheels 206 (the vehicle has four wheels, two of which are shown in FIG. 2). Although the example autonomous vehicle 202 has four wheels, the systems and methods described herein may be incorporated into vehicles having fewer or a greater number of wheels, and/or tracks. The example vehicle 202 may have four-wheel steering and may operate generally with equal performance characteristics in all directions. For example, a first end 208 of the vehicle 202 may be the front end of the vehicle 202 when traveling in a first direction 210, and the first end 208 may become the rear end of the vehicle 202 when traveling in the opposite, second direction 212, as shown in FIG. 2. Similarly, a second end 214 of the vehicle 202 may be the front end of the vehicle 202 when traveling in the second direction 212, and the second end 214 may become the rear end of the vehicle 202 when traveling in the first direction 210. These example characteristics may facilitate greater maneuverability, for example, in small spaces or crowded environments, such as parking lots and urban areas. As also illustrated, a 3D coordinate system is associated with the vehicle 202, with Y-axis along the direction of motion of the vehicle 202 (e.g., the first direction 210 or the second direction 212), X-axis perpendicular to the direction of motion and on a horizontal plane, and Z-axis along a height in a vertical direction.

The example vehicle 202 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 202 may be configured to control all functions from start to completion of the trip, including all parking functions, it may not include a driver and/or controls for driving the vehicle 202, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled. In some instances, the techniques can be implemented in any system using machine vision to navigate an environment, and is not limited to vehicles.

The vehicle 202 may include a plurality of sensors, including one or more LiDAR sensors 216a, 216b. In examples, the LiDAR sensors 216a, 216b may be substantially identical, e.g., except for their position on the vehicle 202. In some examples, the vehicle 202 may include one or more additional LiDAR sensors (not shown), which may be substantially identical to the sensors 216a, 216b, and arranged to cover a substantially 360-degree field-of-view around the vehicle 202. Alternatively, or in addition, the vehicle 202 may also include one or more radar or 4D radar sensors 218a, 218b. As discussed above, the LiDAR sensors 216a, 216b produce a 3D point cloud of the environment based on time-of-flight measurements of reflected light to return to receiver(s) of the LiDAR sensors 216a, 216b. In some examples, the 3D point cloud may be generated by aggregating reflected returns over a short time period (e.g., ⅟30 seconds). While the techniques described herein are applicable to LiDAR sensor-generated point clouds, radar sensors 218a, 218b, such as 4D radar sensors, may also produce 3D point clouds of the environment where the techniques described herein may be applicable. Although two modalities of sensors 216, 218 are illustrated in FIG. 2, the vehicle 202 may include any number of additional sensors, with any number of different modalities. Without limitation, the additional sensors (not shown) may be one or more of inertial sensors (e.g., inertial measurement units, accelerometers, magnetometers, gyroscopes, etc.), imaging sensors (e.g., cameras, including stereo cameras and range cameras), time-of-flight sensors, sonar sensors, thermal imaging sensors, or any other sensor modalities.

As illustrated, scene 220 represents a portion of the environment 200 in which the vehicle 202 is operating. The scene 220 illustrates various time-invariant or permanent elements commonly represented in a road network map of the environment 200, such as pedestrian crosswalk(s) 222, stop line 224, sidewalk 226, and the like, and other permanent elements that are part of a background, such as tree(s) 228, buildings 230, and the like. The scene 220 also illustrates various transient elements, such as vehicle(s) 232, pedestrian(s) 234, and the like.

As illustrated in the block diagram accompanying FIG. 2, sensor system(s) 236 of the vehicle 202 may generate sensor data, such as LiDAR data 238 captured by the LiDAR sensors 216a, 216b, radar data 240 captured by the radar sensors 218a, 218b, and/or image data 242 captured by imaging sensors (not shown). In some examples, sensor data of fewer or additional sensor modalities than shown may be present. The LiDAR data 238 may include measurements used to compute a 3D point cloud of the scene 220 (e.g., 3D position of points in a local or global coordinate system), and information associated with the points in the 3D point cloud, such as intensity information, signal-to-noise ratio (SNR), velocity information, a confidence score associated with the data indicative of an accuracy of the data, and the like. Alternatively, or in addition, the radar data 240 and/or image data 242 may also be used to compute the 3D point cloud of the scene 220. Although a 3D point cloud is used as an example, LiDAR and other data may be represented in other ways and still benefit from the teachings of this disclosure.

The sensor system(s) 236 may provide the sensor data, such as the LiDAR data 238, to vehicle computing system(s) 244. The sensor systems 236 may provide the sensor data 238, 240, 242 continuously, or at discrete time intervals, while the vehicle 202 is operating in the environment 200. In some examples, the discrete time interval between providing the sensor data 238, 240, 242 may be based on a speed of the vehicle 202 e.g., the time interval may be smaller when the speed of the vehicle 202 is higher.

As shown in FIG. 2, the vehicle computing system(s) 244 may implement a sensor data filtering component 246. In some examples, the sensor data filtering component 246 may instead be implemented on an external computing system accessible to the vehicle computing system(s) 244 via a network. In examples, the sensor data filtering component 246 may filter out portions of the LiDAR data 238 that are not relevant to road network maps, and generate filtered data 248 which retains remaining portions of the LiDAR data 238. For example, road network maps typically include map elements that are on or near a ground plane on which a vehicle is traveling (e.g., the road surface 204). In examples, the LiDAR sensors 216a, 216b may be associated with a virtual origin 250, which may be at a height 252 above the ground plane or the road surface 204, as shown in FIG. 2. The virtual origin 250 may form a center of a coordinate frame in which data points of the LiDAR data 238 are localized. The sensor data filtering component 246 may use a first threshold distance 254a below the height 252, and a second threshold distance 254b above the height 252, to filter the LiDAR data 238. For example, LiDAR returns from surfaces at a height below the first threshold distance 254a from the height 252, and LiDAR returns from surfaces at a height above the second threshold distance 254b from the height 252 may be filtered out from the LiDAR data 238. In a non-limiting example, the first threshold distance 254a may be set to 50 cm, and the second threshold distance 254b may be set to 30 cm. In some examples, the first threshold distance 254a may correspond to a height of an axle of the vehicle 202 above ground level. As illustrated in a 2D representation of LiDAR data points 256 captured from the scene 220, LiDAR data 230L corresponding to surfaces of the buildings 230, are filtered out by the sensor data filtering component 246 for being at a height above the second threshold distance 254b from the virtual origin 250. Whereas LiDAR data 258 covering LiDAR returns from the road surface 204, the crosswalk 222, the stop line 224, the sidewalk 226, and other areas which are on or near the ground plane are within the threshold distances 254a, 254b from the virtual origin 250, and are therefore retained in the filtered data 248. In addition, LiDAR data 222L and 224L, corresponding to the crosswalk 222 and the stop line 224 respectively, may be characterized by a high intensity signature in the LiDAR data 258 due to their high-intensity markings. In some examples, LiDAR data associated with certain classifications of sensor data from other sensor modalities (e.g., visual camera) may be enhanced to exhibit readily identifiable intensity signature(s). For example, regions corresponding to road markings in yellow, red, blue, or green colors may be detected from a camera image, and lidar data in these regions may be enhanced in accordance with the color of the region.

In some examples, the sensor data filtering component 246 may identify data points corresponding to transient elements (e.g., vehicles, pedestrians, construction equipment etc.) in the LiDAR data 238, and filter out these data points so that the filtered data 248 primarily corresponds to time-invariant elements of the scene 220. In some examples, object tracking and machine-learning based object recognition may be used to identify transient (or dynamic) vs static objects in scenes e.g., using techniques such as those described in U.S. patent application Ser. No. 16/866,865, filed May 5, 2020, and U.S. patent application Ser. No. 17/364,603, filed Jun. 30, 2021, the entirety of both of which are hereby incorporated by reference for all purposes, as noted above. In the example 2D representation of LiDAR data 256 shown in FIG. 2, blob of data points 232L corresponding to the vehicle 232, and blob of data points 234L corresponding to the pedestrian 234 may be identified as transient elements and filtered out from the LiDAR data 238. The blobs of points 232L, 234L may be spatial clusters or groupings identified in the LiDAR data 238. Though shown as two-dimensional for simplicity of illustration, the representation of LiDAR data 256, it is to be understood that the LiDAR data 238 is three-dimensional, and may be represented by 3D data points in a 3D voxel space, as described in further detail with reference to FIG. 3 below. Accordingly, the blobs of points 222L, 224L, 228L, 230L, 232L, 234L are also three-dimensional.

Additionally, the sensor data filtering component 246 may also remove data associated with low confidence scores. As noted above, in some instances, LiDAR data may include a confidence score associated with individual or groups of data points indicative of an accuracy of the data. For example, the confidence score may be based on functioning of the sensor (e.g., the confidence score may be lower if malfunction is detected), value of signal-to-noise ratio (e.g., data points with low SNR may result in a correspondingly low confidence score), and/or on environmental conditions that may affect sensor performance (e.g., the confidence score of the LiDAR data 238 as a whole may be lower in adverse weather conditions). As an example, in the spatial map of LiDAR data 256 shown in FIG. 2, blob of points 228L corresponding to the tree 228 may be filtered out due to low confidence score which may be caused by low SNR values as LiDAR returns may be reflected erratically from leaves of the tree 228.

In some examples, the vehicle computing system(s) 244 may store the filtered data 248 and/or the sensor data 238, 240, 242 in a local memory 260 onboard the vehicle 202.

The vehicle computing system(s) 244 may also transmit the filtered data 248 and/or the sensor data 238, 240, 242, or a compressed representation thereof, to external computing systems for further processing or storage. The filtered data 248 and/or the sensor data 238, 240, 242 may be transmitted as generated and/or acquired, or periodically, at regular intervals. In some examples, the transmission of the filtered data 248 and/or the sensor data 238, 240, 242 may be triggered by events such as amount of unused space left in the memory 260 falling below a threshold, unusual conditions detected in the environment 200 that the vehicle 202 is traversing, as a response to debugging requests, and the like.

Though the techniques above are described in the context of the LiDAR data 238, in some examples, the vehicle computing system(s) 244 may process sensors of other modalities, or combination of modalities, carried by the vehicle 202. For example, the vehicle computing system(s) 244 may process each of the sensor data 238, 240, 242 separately (e.g., the vehicle computing system(s) 244 may implement separate sensor data filtering components 246 for each sensor modality), and combine results in the filtered data 248 (e.g., using "late sensor fusion" techniques). In other examples, the sensor data 238, 240, 242 may be combined (e.g., using "early sensor fusion" techniques) before applying the sensor data filtering component 246 to the combined or merged sensor data.

Figure 3:
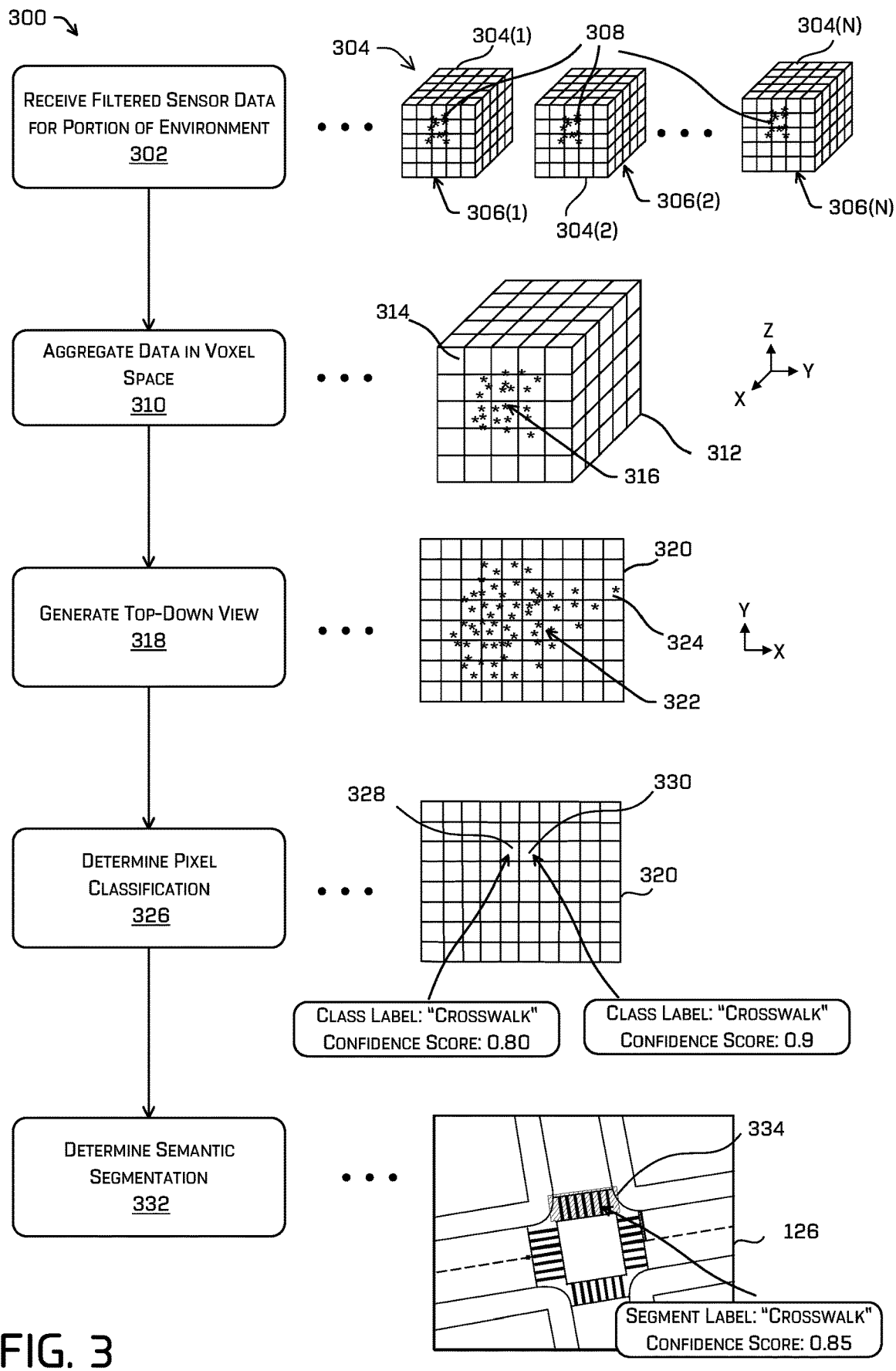
FIG. 3 includes textual and visual flowcharts to illustrate an example method for using LiDAR data to determine a semantic segmentation of a top-down view of a scene, as described herein.

FIG. 3 includes textual and visual flowcharts to illustrate an example process 300 for determining a semantic segmentation of a top-down view of a scene generated from three-dimensional (3D) sensor data e.g., LiDAR data. In examples described herein, the sensor data may be obtained by LiDAR sensors disposed on an autonomous vehicle, such as the vehicle 202. In this example, the process 300 generates a two-dimensional (2D) image (e.g., a top-down view) from an aggregate representation of the 3D sensor data, and determines a semantic segmentation of the image indicating map elements relevant for road network maps.

At an operation 302, the process 300 includes receiving filtered sensor data 304 for a portion of an environment. The filtered sensor data 304 may be obtained from raw sensor data, as captured by sensors of vehicle(s), as an output of the sensor data filtering component 246, for example, and may primarily include returns associated with a drivable surface and/or feature near a ground plane, such as a driving lane, a turn lane, a stop line, a crosswalk, and the like. As shown, the filtered sensor data 304 may comprise instances of sensor data 304(1), 304(2), 304(N), (collectively, the instances 304 or singularly, the instance or each instance 304) associated with the portion of the environment, where each instance 304 may be captured during different trips and/or different times by vehicles traversing the portion of the environment. In examples, each instance 304 may be associated with a corresponding 3D voxel space 306 (of which a first voxel space 306(1), a second voxel space 306(2), through and $N^{th}$ voxel space 306(N) are illustrated, where origin(s) of each of the voxel spaces 306 may correspond to a virtual origin associated with a sensor capturing the sensor data. Individual data points 308 of the filtered sensor data 304 may be represented in the voxel spaces 306 corresponding to the respective instance 304 during which the individual data points 308 were captured. In some instances, voxels of the voxel spaces 306 can represent any number of data, including but not limited to, a covariance matrix, location information, classification information, segmentation information, a number of observations, whether the voxel is occupied or not, and the like.

At an operation 310, the process 300 includes aggregating the filtered sensor data 304 in a common 3D voxel space 312. The operation 310 may include determining alignments between the individual voxel spaces 306 and the voxel space 312 based on location and/or trajectory information of vehicle(s) at a time of capture of the corresponding sensor data. For example, a combination of inertial data from inertial sensors on the vehicle, global positioning data from vehicle GPS systems, and/or pose estimation based on matching landmarks in the scene (e.g., based on camera image features) may be used to generate an optimized 3D pose and location of the vehicle at the time of capture of each instance of the filtered sensor data 304. Examples of techniques for determining an alignment between a first trajectory and a second trajectory (e.g., using an algorithm such as CLAMS (calibration, localization, and mapping, simultaneously) or SLAM (simultaneous localization and mapping)), are discussed in U.S. Pat. No. 10,983,199, issued on Apr. 20, 2021 and U.S. Pat. No. 10,782,136 issued on Sep. 22, 2020, the entirety of which are incorporated by reference, as noted above. For example, the alignment between an individual of the voxel spaces 306 and the voxel space 312 may indicate a 3D affine transformation (e.g., rotation, translation, scaling, and shear) to be applied to the voxel space to align it spatially with the voxel space 312. As can be understood, a different 3D affine transformation may be needed for each of the voxel spaces 306.

As illustrated, the voxel space 312 can extend in three dimensions (e.g., X, Y, Z), and may include any number of voxels along each dimension. In some instances, the voxel space 312 may correspond to a physical volume of the portion of the environment. For example, the voxel space 312 may represent a physical volume 100 centimeters wide, 100 centimeters long, and 100 centimeters high. Further, each voxel (e.g., a voxel 314) in the voxel space 312 may represent a physical volume, such as 5 centimeters in each dimension. In some instances, voxels may be of a uniform size throughout the voxel space 312, while in some instances, a volume of a voxel may vary based on a location of the voxel relative to an origin of the voxel space 312. In some instances, ground plane voxels corresponding to a ground plane may be determined in the voxel space 312, and the volume or size of a voxel in the voxel space 312 may be smaller closer to the ground plane voxels to capture more detail, and may increase in proportion to a distance from the voxel to the ground plane voxels.

In examples, the data points 308 of the filtered sensor data 304 may be mapped to voxels of the common voxel space 312 to obtain aggregated data 316. Individual data points of the data points 308 may be mapped to the voxel space 312 by applying the 3D affine transformation for alignment between their corresponding voxel space 306 and the voxel space 312. Though depicted as multiple data points for illustrative purposes, each voxel may store a single data point obtained by integrating all data (e.g., LiDAR returns) from the physical volume corresponding to the voxel. For example, data points may be statistically accumulated in individual voxels, and individual voxels may include data representing a number of returns, an average intensity, an average x-value of the data, an average y-value of the data, an average z-value of the data, and/or a covariance matrix based on the sensor data associated with the individual voxel. Since road map elements are typically characterized by high reflectivity, voxels containing such road map elements may be associated with higher values of average intensity.

In examples, some or all voxels of the voxel space 312 may be preinitialized with data representing previously captured sensor data. In some examples, the voxel space 312 may be initialized as empty space and sensor data may be added to the voxel space 312 as it is captured. In other examples, voxels within the voxel space 312 may be instantiated when sensor data is to be associated with such a voxel, thereby reducing or minimizing an amount of memory associated with a voxel space. As a non-limiting example, this may be performed using techniques such as voxel hashing. In yet other examples, voxels that do not include data, or that include a number of points below a threshold number, may be discarded or omitted in order to create a sparse voxel space.

At an operation 318, the process 300 includes generating a top-down view of the aggregated data 316 in the voxel space 312. The top-down view may be represented as a 2D image 320 in the (X, Y) plane of the (X, Y, Z) axes of the 3D voxel space 312. As noted with reference to FIG. 2, the Z-axis is associated with vertical height, and therefore, image data 322 in pixels of the image 320 (e.g., a pixel 324) represents a top-down perspective or plan view of the voxel space 312, where the height is collapsed or flattened. In some examples, the pixels of the image 320 may represent a cumulative intensity value obtained by adding intensity values contributed by the instances 304 of the filtered sensor data at each pixel location.

In other examples, the 2D image 320 may represent an average intensity value, and/or a weighted mean intensity value weighted by a number of data points, of intensity values along each column in the Z-direction of the voxel space 312. As can be understood, LiDAR returns corresponding to time-invariant features of the portion of the environment are expected to occur in a large proportion of the instances of the filtered sensor data 304, resulting in higher values of the weighted mean intensity or the average intensity.

Correspondingly, even if LiDAR returns representing transient elements are not completely filtered out, such returns are expected to occur in a small proportion of the instances of the filtered sensor data 304, and accordingly, corresponding average intensity values in the image 320 would be low. Thus, the 2D image 320 effectively represents the voxel space 312 as viewed from above and emphasizes time-invariant features at or close to the ground plane of the portion of the environment.

At an operation 326, the process 300 includes determining a pixel classification associated with pixels of the 2D image 320. The operation 326 may determine pixel classifications by inputting the 2D image 320 into a machine-learned (ML) model trained to determine a class label, from among a specified set of class labels, and receiving an output comprising class labels corresponding to individual pixels of the image 320. As described above, the specified set of class labels may include class labels relevant to a road network, corresponding to map elements such as "lane of road," "bike lane," "left turn lane," "sidewalk," "crosswalk," and the like. The specified set of class labels may also include permanent elements of the environment such as "building," "vegetation," "water body," and the like, as well as a catch-all class label (e.g., "other" or "background") that is used to label pixels not falling into one of the other classes of the set of class labels. The classification may include a confidence score indicative of correctness of the class label. For example, the trained ML model may determine the confidence score based on an a priori probability of the class label and a class label probability computed for the individual pixel during classification. As a non-limiting example, the trained ML model may comprise a fully convolutional network (FCN), which returns an output image of the same size as the input image (e.g., the image 320), where the output image includes class labels and pixel-level confidence scores associated with individual pixels. Whereas traditional machine learning classifiers may output a global class label given an input image, the output image produced by an FCN provides localization of the class labels, since individual pixels which are located at known (x, y) coordinates within the output image, which corresponds to the same (x, y) coordinates within the input image. In an example illustrated in FIG. 3, which is based on the 2D image 126 of FIG. 1, a pixel 328 may be classified with a class label of "crosswalk" with a confidence score of 0.8, and a neighboring pixel 330 may also be classified with a class label of "crosswalk" with a confidence score of 0.9.

At an operation 332, the process 300 includes determining a semantic segmentation of the 2D image 320, which comprises map data identifying both a class label associated with portion(s) or segment(s) of the 2D image 320, spatial extent(s) of the portion(s) or segment(s) within the 2D image 320 (e.g., bounding box(es) encapsulating the two-dimensional segment(s), or splines fitted to linear segments), and in some examples, segment-level confidence score(s) associated with the identified segment(s). In some examples, determining the semantic segmentation may include clustering spatially contiguous pixels with a same class label in the output generated by the ML model (e.g., an FCN) by using connected-component analysis techniques known in the art, for example. In such examples, a neighborhood may be defined around each pixels, and clusters may be iteratively expanded from a "seed" pixel by adding pixels with the same class label within the defined neighborhood. In addition, a segment-level confidence score for each segment may be computed based on the pixel-level confidence scores obtained as output from the ML model. For example, the segment-level confidence score may be an average value or a median value of the pixel-level confidence scores of the pixels in the segment.

In the example illustrated in FIG. 3, 332, neighboring pixels 328 and 330 share the same class label "Crosswalk." Therefore, during the operation 332, the pixels 328, 330 may be clustered into a segment 334, as shown in the example 2D image 126. Further, the segment 334 may be assigned the segment-level label "Crosswalk" and a segment-level confidence score 0.85 (e.g., an average of the pixel-level confidence scores). Map data corresponding to the segment 334 may include a bounding box indicating an extent of the segment 334, the class label (e.g., "Crosswalk") and the associated segment-level confidence score. In some examples, the bounding box may not be rectangular, and may instead comprise a polygonal representation, an elliptical representation, a set of contour points, and the like. Though pixels 328 and 330 are used as an example, it is understood that a typical segment would include a larger number of pixels. The operation 332 may also compare segment sizes with a minimum size threshold, and eliminate segments of size (e.g., number of pixels in the segment) less than the minimum size threshold.

In an alternative implementation, the operation 332 may be directly executed after the operation 310, by using a ML model trained to segment and classify three-dimensional data, such as the aggregated data in the voxel space 312. In some examples, techniques described in U.S. patent application Ser. No. 17/127,196 filed on Dec. 18, 2020, titled "Multi-Resolution Top-Down Segmentation," which is incorporated by reference herein in its entirety for all purposes, may be used to identify objects by determining portions of LiDAR data corresponding to the objects. Alternatively, or in addition, machine-learned model and techniques for determining semantic segmentation of sensor data, as discussed in U.S. Pat. No. 10,535,138 issued on Jan. 14, 2020, titled "Sensor Data Segmentation," which is incorporated by reference herein in its entirety for all purposes, may be used to associate class labels with segments without requiring generation of a top-down view.

Figure 4:
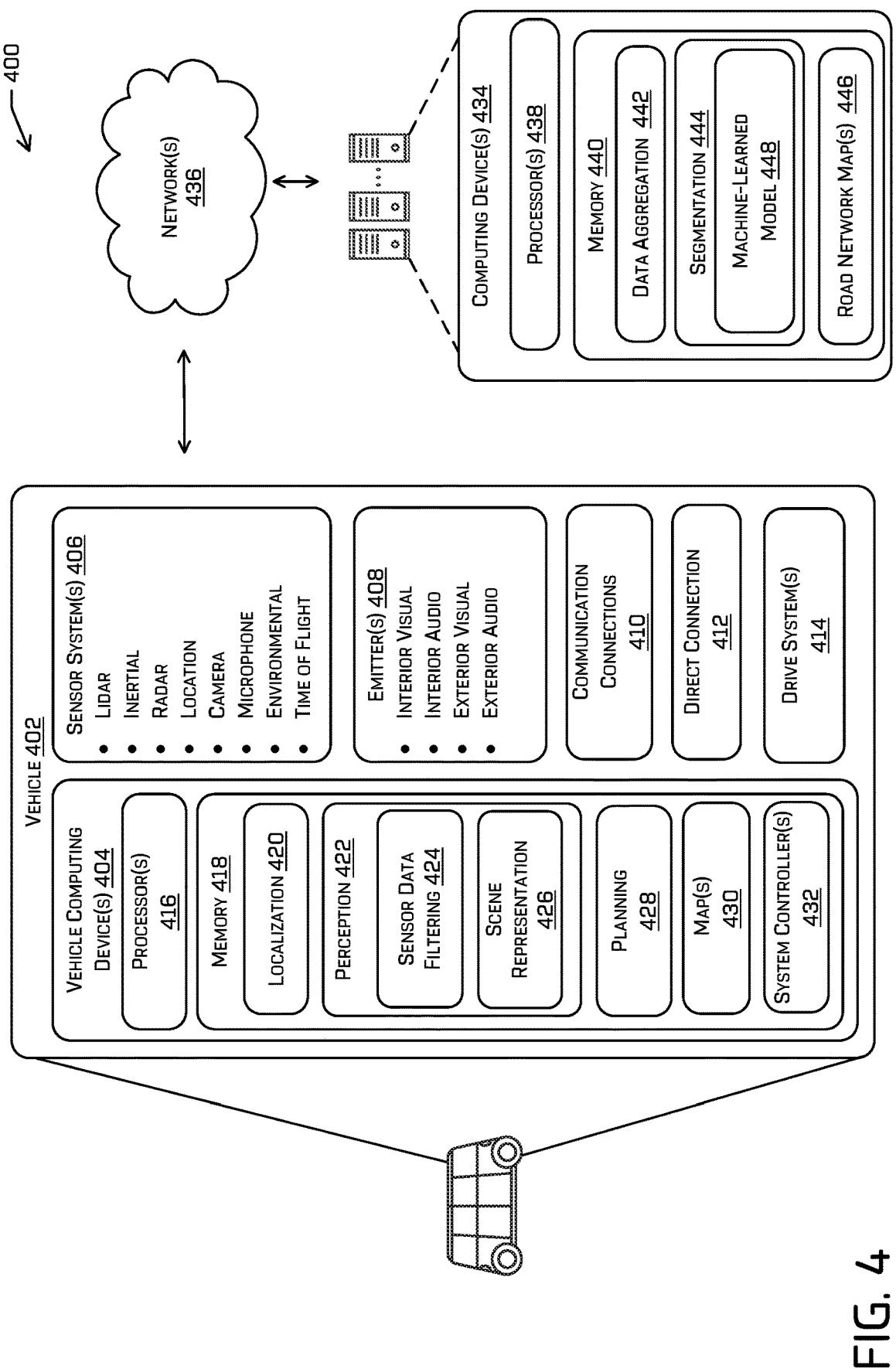
FIG. 4 is a block diagram illustrating an example computing system for implementing the techniques described herein.

FIG. 4 is a block diagram of an example system for implementing the techniques described herein. In at least one example, the system 400 may include a vehicle 402, which can be similar to vehicles 102 (1, 2, . . . , N). In the illustrated example system 400, the vehicle 402 may be an autonomous vehicle such as vehicle 202; however, the vehicle 402 may be any other type of vehicle.

The vehicle 402 may include one or more computing device(s) 404, one or more sensor system(s) 406, one or more emitter(s) 408, one or more communication connection(s) 410 (also referred to as communication devices and/or modems), at least one direct connection 412 (e.g., for physically coupling with the vehicle 402 to exchange data and/or to provide power), and one or more drive system(s) 414. The one or more sensor system(s) 406 may be configured to capture sensor data associated with an environment.

The one or more sensor system(s) 406 may include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor system(s) 406 may include multiple instances of each of these or other types of sensors. For instance, the time-of-flight sensors may include individual time-of-flight sensors located at the corners, front, back, sides, and/or top of the vehicle 402. As another example, the camera sensors may include multiple cameras disposed at various locations about the exterior and/or interior of the vehicle 402. The one or more sensor system(s) 406 may provide input to the computing device 404.

The vehicle 402 may also include one or more emitter(s) 408 for emitting light and/or sound. The one or more emitter(s) 408 in this example include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 402 may also include one or more communication connection(s) 410 that enable communication between the vehicle 402 and one or more other local or remote computing device(s) (e.g., a remote teleoperation computing device) or remote services. For instance, the one or more communication connection(s) 410 may facilitate communication with other local computing device(s) on the vehicle 402 and/or the one or more drive system(s) 414. Also, the one or more communication connection(s) 410 may allow the vehicle 402 to communicate with other nearby computing device(s) (e.g., other nearby vehicles, traffic signals, etc.).

The one or more communications connection(s) 410 may include physical and/or logical interfaces for connecting the computing device 404 to another computing device or one or more external networks 440 (e.g., the Internet). For example, the one or more communications connection(s) 410 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 402 may include one or more drive system(s) 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 may include one or more sensor system(s) 406 to detect conditions of the drive system(s) 414 and/or the surroundings of the vehicle 402. By way of example and not limitation, the sensor system(s) 406 may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 414. In some cases, the sensor system(s) 406 on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive system controller which may receive and preprocess data from the sensor system(s) 406 and to control operation of the various vehicle systems. In some examples, the drive system controller may include one or more processor(s) and memory communicatively coupled with the one or more processor(s). The memory may store one or more components to perform various functionalities of the drive system(s) 414. Furthermore, the drive system(s) 414 also include one or more communication connection(s) that enable communication by the respective drive system with one or more other local or remote computing device(s).

The computing device 404 may include one or more processor(s) 416 and memory 418 communicatively coupled with the one or more processor(s) 416. In the illustrated example, the memory 418 of the computing device 404 stores a localization component 420, a perception component 422 comprising a sensor data filtering component 424 and a scene representation component 426, a prediction component 428, a planning component 430, a maps component 432, and one or more system controller(s) 434. Though depicted as residing in the memory 418 for illustrative purposes, it is contemplated that the localization component 420, the perception component 422, the prediction component 428, the planning component 430, the maps component 432, and the one or more system controller(s) 434 may additionally, or alternatively, be accessible to the computing device 404 (e.g., stored in a different component of vehicle 402) and/or be accessible to the vehicle 402 (e.g., stored remotely).

In memory 418 of the computing device 404, the localization component 420 may include functionality to receive data from the sensor system(s) 406 to determine a position of the vehicle 402. For example, the localization component 420 may include and/or request/receive a three-dimensional map of an environment and may continuously determine a location of the autonomous vehicle within the map. In some examples, the localization component 420 may use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle (e.g., point and heading on a map, latitude and longitude with a heading direction etc.). In examples, the localization component 420 may provide data to various components of the vehicle 402 to determine a precise location of the autonomous vehicle 402 in an environment the vehicle is traversing, as discussed herein. In some examples, the location of the autonomous vehicle 402 may be associated with sensor data captured by the sensor system(s) 406 at that location.

The perception component 422 may include functionality to perform object detection, segmentation, and/or classification. In some examples, the perception component 422 may include the sensor data filtering component 424 which may implement functionality similar to the sensor data filtering component 246. In examples, the sensor data filtering component 424 may process sensor data from the sensor system(s) to filter out portions of the sensor data that may not be relevant to road network maps. For example, the sensor data filtering component 424 may filter out portions of sensor data associated with surfaces in the environment that are at an elevation higher than a vertical distance threshold from a ground plane, with transient elements in the environment (e.g., vehicles, pedestrians, etc.), and/or associated with low confidence scores, as described with reference to FIG. 2.

The perception component 422 may also include a scene representation component 426 which may generate a scene representation of a portion of the environment that the vehicle 402 is traversing. The scene representation component 426 may represent filtered sensor data output by the sensor data filtering component 424 in a 3D voxel space. As described above, the 3D voxel space may represent a physical volume in the portion of the environment around an origin corresponding to a virtual origin of the sensor system(s) 406. A global location of the physical volume represented by the 3D voxel space may be uniquely identified using position information of the vehicle 402 e.g., as provided by the localization component 420, and the scene representation may be associated with the unique global location. In additional and/or alternative examples, the perception component 422 may provide processed sensor data that indicates one or more characteristics associated with the environment, which may include, but are not limited to, a presence of another entity in the environment, a state of another entity in the environment, a time of day, a day of a week, a season, a weather condition, an indication of darkness/light, etc.

The planning component 428 may determine a path for the vehicle 402 to follow to traverse through an environment. For example, the planning component 428 may determine various routes and paths at various levels of detail. In some examples, the planning component 428 may determine a route to travel from a first location (e.g., a current location) to a second location (e.g., a target location). For the purpose of this discussion, a route may be a sequence of waypoints for traveling between two locations. As non-limiting examples, waypoints include streets, intersections, global positioning system (GPS) coordinates, etc. Further, the planning component 428 may generate an instruction for guiding the autonomous vehicle along at least a portion of the route from the first location to the second location. In at least one example, the planning component 428 may determine how to guide the autonomous vehicle from a first waypoint in the sequence of waypoints to a second waypoint in the sequence of waypoints. In some examples, the instruction may be a path, or a portion of a path. The planning component 428 may utilize maps, such as the road network maps discussed herein, to determine the waypoints or route for traveling between two locations.

The memory 418 may further include one or more maps 430, such as the road network maps discussed herein, that may be used by the vehicle 402 to navigate within the environment. However, a map may be any number of data structures modeled in two dimensions, three dimensions (e.g., a three-dimensional mesh of the environment), or N-dimensions that are capable of providing information about an environment, such as, but not limited to, topologies (such as intersections), streets, mountain ranges, roads, terrain, and the environment in general. In some examples, the map(s) 430 may be stored in a tiled format, such that individual tiles of the map represent a discrete portion of an environment, and may be loaded into working memory as needed, as discussed herein. In some examples, the vehicle 402 may be controlled based at least in part on the map(s) 430. That is, the map(s) 430 may be used in connection with the localization component 420, the perception component 422 (and sub-components), and/or the planning component 428 to determine a current location of the vehicle 402 and/or generate routes and/or trajectories to navigate within an environment.

In at least one example, the computing device 404 may include one or more system controller(s) 432, which may be configured to control steering, propulsion, braking, safety, emitters, communication, and other systems of the vehicle 402. These system controller(s) 432 may communicate with and/or control corresponding systems of the drive system(s) 414 and/or other components of the vehicle 402, which may be configured to operate in accordance with a path provided from the planning component 430.

The vehicle 402 may connect to computing device(s) 434 via network 436 and may include one or more processor(s) 438 and memory 440 communicatively coupled with the one or more processor(s) 438. In at least one instance, the one or more processor(s) 438 may be similar to the processor(s) 416 and the memory 440 may be similar to the memory 418. In the illustrated example, the memory 440 of the computing device(s) 434 stores a data aggregation component 442, a segmentation component 444, and/or a road network maps component 446. In at least one instance, the segmentation component 444 may store a pre-trained ML model 448 to be used for classifying and/or segmenting map elements from representations of sensor data, as discussed herein. Though depicted as residing in the memory 440 for illustrative purposes, it is contemplated that the data aggregation component 442 and/or the segmentation component 444 may additionally, or alternatively, be accessible to the computing device(s) 434 (e.g., stored in a different component of computing device(s) 434 and/or be accessible to the computing device(s) 434 (e.g., stored remotely on a cloud storage).

The data aggregation component 442 may include functionality for receiving sensor data or representations thereof (e.g., output of the scene representation component 426) from one or more vehicles (e.g., similar to the vehicle 402 and the vehicles 102(1, 2, N)) during multiple traversals of an environment, which may include an indication of a precise location of capture of the sensor data. In examples, the sensor data may be collected at regular time intervals or when a change is expected (e.g., due to known construction work, traffic flow changes etc.). In some examples, the data aggregation component 442 may accumulate data associated with a same portion of the environment or scene, based on the location of capture of the sensor data, in voxels of a common 3D voxel space, as discussed herein. In some examples, the common 3D voxel space may also include texture or color information (e.g., in an RGB, Lab, HSV/HSL color space, and the like), individual "surfels" (e.g., polygons associated with individual color and/or intensity)), reflectivity information (e.g., specularity information, retroreflectivity information, BRDF information, BSSRDF information, etc.), and the like, associated with individual voxels of the 3D voxel space, in addition to average intensity or weighted mean intensity information (e.g., from LiDAR data, radar data, and the like). The data aggregation component 442 may also compute projections of the aggregated 3D data to generate two-dimensional views (e.g., a top-down view) of the scene, as discussed herein.

In some examples, the data aggregation component 442 may maintain 3D voxel spaces populated with previously captured data, which may be indexed by location of capture of the sensor data. The 3D voxel spaces may be updated when additional data is received (e.g., from vehicle 402). In some examples, voxels within the common 3D voxel space may be instantiated only when sensor data is to be associated with such a voxel, thereby maintaining a sparse voxel space representation, using techniques such as voxel hashing, for example.

The segmentation component 444 may include functionality to segment and classify an aggregate data representation generated by the data aggregation component 442 (e.g., the common 3D voxel space or a 2D projection image thereof) to generate map data indicating extents of segment(s) and corresponding class labels. In some examples, the segmentation component 444 may implement functionality of the semantic classifier 128 and/or the operations 326 and 332, to generate a semantically labeled segmented image and/or map data, as described above. In other examples, the segmentation component 444 may apply 3D segmentation techniques to identify segments directly in the 3D voxel space. The segmentation component 444 may include a machine-learned (ML) model 448 trained for segmentation and/or classification tasks in 2D or 3D. As an example, the ML model 448 may comprise a fully convolutional network (FCN) trained to identify class labels (e.g., map elements such as "driving lane," "crosswalk," "stop line," and the like) associated with individual pixels of a 2D input image (e.g., a top-down view of a road network). In such an example, the segmentation component 444 may further determine segments (e.g., groups of contiguous pixels of the same class label), based on the output received from the trained ML model 448 (e.g., an FCN). In other examples, the ML model 448 may be trained to directly determine segments, and corresponding class labels, in a 2D input image (e.g., a top-down view) or in 3D data (e.g., the common 3D voxel space). Though depicted as residing in the memory 440 for illustrative purposes, it is contemplated that the ML model 448, may additionally, or alternatively, be accessible to the computing device 434 via a software as a service (SaaS) interface of a cloud computing platform. The segmentation component 444 may also determine segment-level confidence score(s) for identified segments, which may be based on class probabilities outputted by the ML model 448.

The memory 440 may also include the road network map(s) component 446 which may include functionality for creating or updating road network map(s) based on an output of the segmentation component 444 (e.g., identified segments with class labels, and corresponding confidence scores). In examples, if a confidence score associated with an identified segment is equal to or greater than a minimum threshold, the class label associated with the segment, and/or a spatial extent of the segment may be transferred to a road network map of the environment. In examples, the road network map may comprise, but is not limited to, a top-view of the environment with semantically labeled map elements showing spatial extents of the map elements. In other examples, the road network map(s) 446 may comprise a three-dimensional mesh of the environment, where semantic labels may be applied to polygonal surfaces of the mesh based on the class labels applied to the identified segments (e.g., as output of the segmentation component 444).

The road network map(s) component 446 may also compare the identified segments with an existing road network map of a same portion of the environment to determine differences. In some examples, the existing road network map(s) may be obtained from third-party map providers. In examples where a currently identified segment and a corresponding segment in the existing road network map have a same class label, the difference may be computed in spatial extents of the two segments. As a non-limiting example, the difference in spatial extents may be computed as an intersection between the two segments (e.g., number of pixels in an overlapping area) divided by a union of the two segments (e.g., number of pixels in an area covered by the segments in conjunction). In some examples, differences in class label or spatial extent may be flagged for human verification (e.g., if the confidence score of a segment is less than a minimum threshold). In other examples, the class label and/or spatial extent of the segment may be automatically updated in the road network map (e.g., if the confidence score of a segment is greater than or equal to the minimum threshold).

In some examples, the existing road network map(s) may be stored in a storage repository remote to the computing device(s) 434, and section(s) of the existing road network map(s) at or in a neighborhood of the location of capture of the received sensor data may be transferred to the memory 440.

The processor(s) 416 of the computing device 404 and the processor(s) 438 of the computing device(s) 434 may be any suitable processor capable of executing instructions to process data and perform operations as described herein. By way of example and not limitation, the processor(s) 416 and 438 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 418 computing device 404 and the memory 440 of the computing device(s) 434 are examples of non-transitory computer-readable media. The memory 418 and 440 may store an operating system and one or more software applications, instructions, programs, and/or data to implement the methods described herein and the functions attributed to the various systems. In various implementations, the memory 418 and 440 may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some examples, aspects of some or all of the components discussed herein may include any models, algorithms, and/or machine-learning algorithms. For example, in some examples, the components in the memory 418 and 440 may be implemented as a neural network. As described herein, an exemplary neural network is an algorithm that passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning or machine-learned algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, Hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

Figure 5:
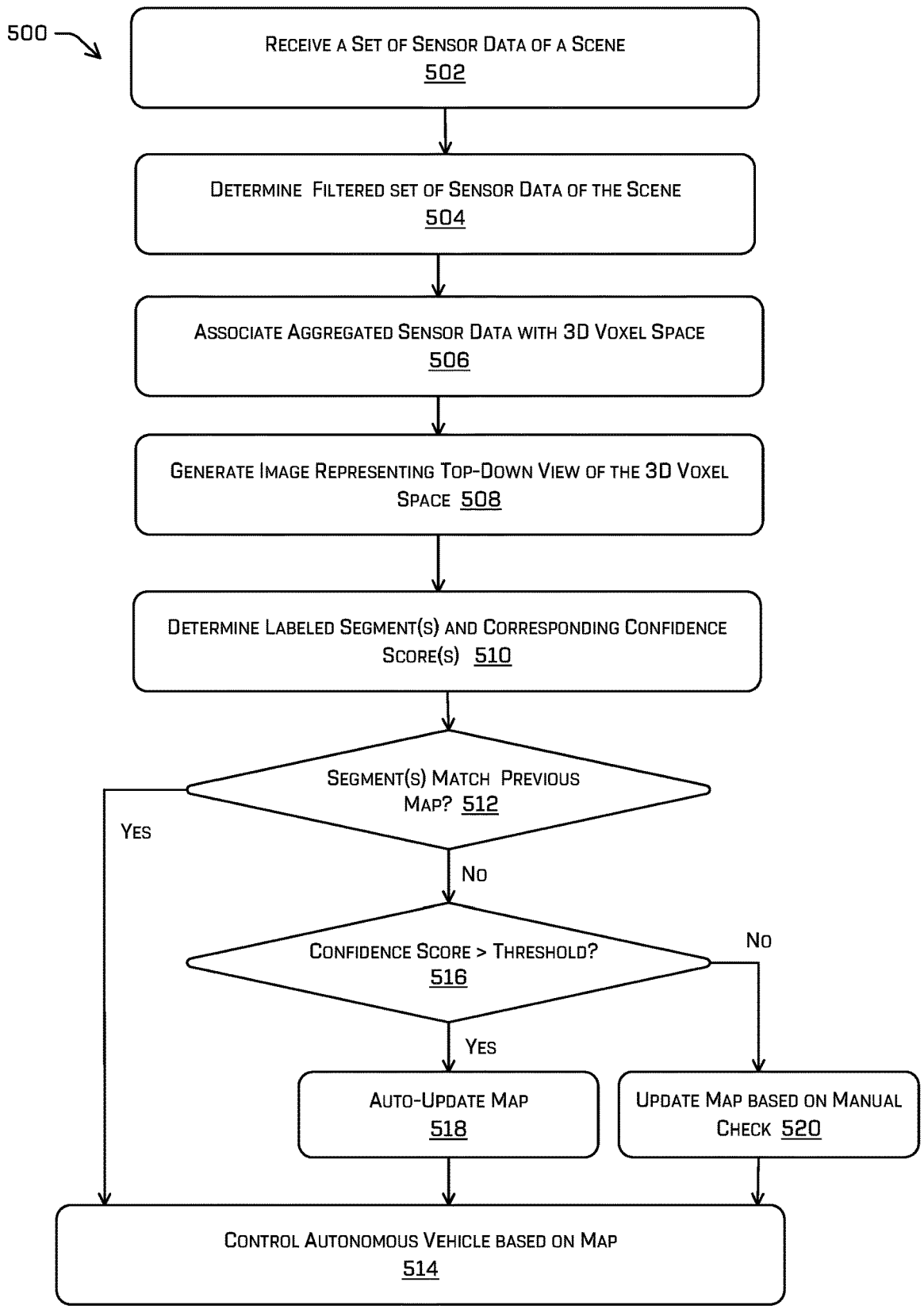
FIG. 5 illustrates an example process for creating or updating road network maps used for controlling an autonomous vehicle, as described herein.

FIGS. 1, 3, and 5 illustrate example processes in accordance with examples of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be omitted or combined in any order and/or in parallel to implement the processes.

FIG. 5 is an example process 500 for updating a map (e.g., of a road network) based on LiDAR data from a scene in an environment, and subsequently, controlling an autonomous vehicle based on the map of the environment. For example, some or all of the process 500 may be performed by one or more components in FIG. 4, as described herein. For example, some or all of the process 500 may be performed by the sensor data filtering component 424, the scene representation component 426, the data aggregation component 442, the segmentation component 444, and/or the road network maps component 446.

At an operation 502, the process may include receiving a set of LiDAR data of a same scene of an environment captured at different times (e.g., during different trips). In some examples, the operation 502 may include receiving LiDAR data, time of flight data, image data, radar data, and the like, of the scene in the environment. In some examples, the set of sensor data of the scene may be captured by a vehicle (e.g., an autonomous vehicle) during multiple distinct traversals of the environment, and may be associated with a precise location of the scene based on a location and/or heading of the vehicle at a time of capture of the corresponding sensor data.

At an operation 504, the process may include determining filtered set of sensor data of the scene. During the operation 504, portion(s) of the set of sensor data that are not relevant to maps of road networks may be filtered out. For example, the portion(s) of sensor data filtered out may include data associated with surfaces in the environment that are at an elevation higher than a vertical distance threshold from a ground plane, data associated with transient elements in the environment (e.g., vehicles, pedestrians, etc.), and/or data associated with low confidence scores (e.g., due to sensor malfunction, poor environmental conditions, low signal-to-noise ratio, and/or characteristics of the surface such as reflectivity). Accordingly, the set of filtered sensor data primarily corresponds to time-invariant elements of the scene that are close to or on the ground plane or drivable surface.

At an operation 506, the process may include associating aggregated sensor data with a 3D voxel space. As described with reference to FIG. 3, individual data of the set of filtered sensor data may be represented in associated 3D voxel spaces that are not spatially aligned in a global 3D coordinate system. The operation 506 may include aligning individual 3D voxel spaces with the 3D voxel space and aggregating the individual data of the set of filtered sensor data into the common 3D voxel space after alignment. Each voxel of the 3D voxel space may be associated with a specific physical volume of the scene. Further, each voxel may store a single data point obtained by integrating all data (e.g., LiDAR returns) from the physical volume corresponding to the voxel. For example, data points may be statistically accumulated in individual voxels, and individual voxels may include data representing a number of returns, an average intensity, an average x-value of the data, an average y-value of the data, an average z-value of the data, and/or a covariance matrix based on the sensor data associated with the individual voxel.

At an operation 508, the process may include generating an image representing a top-down view of the 3D voxel space. The image may be generated by projecting the data in the 3D voxel space (with axes X, Y, and Z), on a two-dimensional plane (with axes X, Y). Pixels of the image may represent a maximum value, a cumulative value, an average intensity value and/or a weighted mean intensity value (e.g., weighted by a number of data points), of the data in corresponding columns of the 3D voxel space. Of course, other views can be used, and the techniques herein are not limited to a top-down view.

At an operation 510, the process may include determining labeled segment(s) in the image, and corresponding confidence score(s) (e.g., map data). The operation 510 may include inputting the image data into a machine learned model to determine a segmentation and/or classification associated with the image. In an example, the machine learned model may comprise a fully convolutional network (FCN) trained to classify pixels of images of top-down views of road networks, as belonging to one of a specified set of semantic class labels indicative of map elements relevant to a map of a road network. The individual pixels of may be clustered into segments based on connected component analysis of the labeled image. The operation 510 may also include determining a confidence score associated with identified segment(s). As an example, computed based on the pixel-level confidence scores obtained as. For example, the segment-level confidence score may be an average value or a median value of pixel-level confidence scores (e.g., as obtained as an output from the ML model) of the pixels in the segment.

At an operation 512, the process may include determining whether the segment(s) identified in the map data generated at the operation 510 match segments corresponding to map elements in an existing map of the same scene. By way of example, a match may be determined if the existing map includes candidate segment(s) with a same class label and matching spatial extent as the segment(s) identified at the operation 510. As a non-limiting example, spatial extents between two segments may be compared by computing a match ratio e.g., an intersection between the two segments (e.g., number of pixels in an overlapping area) divided by a union of the two segments (e.g., number of pixels in a combined area covered by the two segments), and the spatial extents may be considered to match if the match ratio is higher than a threshold (indicating that there is significant overlap). The operation 512 may be performed on a per segment basis, for each of the segment(s) identified at the operation 510.

If it is determined that the segment(s) match (at 512—Yes) e.g., the segment(s) are unchanged, and no update is needed to the existing map, the process 500 may control an autonomous vehicle based at least in part on the existing map at an operation 514. In some examples, the operation 514 may include generating a route (e.g., a sequence of waypoints) between a current location and a destination point on the existing map. The operation 514 may also include determining a trajectory for the vehicle or to otherwise control the vehicle to safely traverse the environment, based at least in part on map elements (e.g., driving lane, stop line, turn lane, and the like) indicated on the existing map. In examples, the operation 514 may be performed by the planning component 428.

Alternatively, if at the operation 512 it is determined that one or more of the segment(s) do not match segment(s) corresponding to map elements of the existing map or otherwise that a previous map does not exist (e.g., in the case that this is a first instance of data collection at the scene) (at 512—No), at an operation 516, the process 500 may determine whether the confidence score(s) associated with the segment(s) that do not match are greater than a minimum confidence threshold. If at the operation 516 it is determined that the confidence score(s) associated with the segment(s) that do not match (e.g., segments that have changed) are greater than the minimum confidence threshold (at 516—Yes), at an operation 518, the existing map may be automatically updated by incorporating the segment(s) that have changed, into the existing map. The operation 518 may include changing a spatial extent of the segment(s), changing a semantic label of the segment(s), adding a new segment and corresponding label, and/or removing a segment from the existing map. In some examples, there may be no existing map (e.g., for a new area of the environment), and all identified segment(s) that are associated with a confidence score greater than the minimum confidence threshold may be added to a newly-created map, which may become the existing map for future executions of the process 500.

Alternatively, if at the operation 516 it is determined that the confidence score(s) associated with the segment(s) that do not match are less than or equal to the minimum confidence threshold (at 516—No), at an operation 520, the existing map may be updated based on a manual check or other verification. In some instances, the existing map may not be updated (e.g., update is a null operation) if it is determined that the identified segment(s) are erroneous. In other instances, the manual check or verification may be followed by an update of the existing maps, which may include modifications to the identified segment(s) (e.g., a class label or spatial extent) before the update. Further, the operation 514 may be performed by the process 500 after the auto-update of the existing map at the operation 518, or the update based on manual check at the operation 520, using the updated map to control the autonomous vehicle.

Example Clauses

A: An example system comprising: one or more processors; and one or more non-transitory computer-readable media storing instructions executable by one or more processors, wherein the instructions, when executed, cause the system to perform operations comprising: receiving LiDAR data representative of a portion of an environment; identifying a subset of the LiDAR data having an elevation greater than a threshold distance from a ground plane; generating filtered LiDAR data excluding the subset of the LiDAR data; associating intensity information of the filtered LiDAR data with a voxel space; determining, based on the intensity information, image data representing a top-down view of the voxel space; inputting the image data into a machine-learned (ML) model; receiving, from the ML model, classification information comprising a classification associated with individual pixels of the image data, wherein the classification is indicative of a road map element of a set of road map elements; determining, based at least in part on the classification information, a segment of the image data corresponding to a first road map element of the set of road map elements, the first road map element corresponding to an element on a driving surface; and updating, based at least in part on the segment of the image data, a road network map of the environment.

B: The system of example A, wherein: the LiDAR data is captured during multiple traversals of the environment by a LiDAR sensor mounted on a vehicle traversing the environment.

C: The system of example A or example B, wherein the intensity information comprises an aggregation of the LiDAR data captured during the multiple traversals based on one of: cumulative intensity, maximum intensity, average intensity, or a weighted average intensity.

D: The system of any one of example A through example C, wherein the ML model comprises a fully convolutional network (FCN) previously trained using training data comprising images of top-down views of road networks wherein pixels of the images are labeled as belonging to a road map element of the set of road map elements.

E: The system of any one of example A through example D, wherein the set of road map elements includes one or more of: a drive lane element; a turn lane element; a bike lane element; a crosswalk element; a sidewalk element; an intersection element; a lane divider element; a stop line element; or a yield line element.

F: The system of any one of example A through example E, wherein updating the road network map comprises: receiving an existing road network map for the portion of the environment, the existing road network map including an area indicative of the first road map element; determining a confidence score associated with the segment of the image data corresponding to the first road map element; determining, based on comparing a spatial extent of the segment with the area, that the segment does not match the area; and updating, based at least in part on the confidence score being greater than a threshold, the area indicative of the first road map element.

G: An example method comprising: receiving sensor data associated with a portion of an environment, wherein the sensor data is captured by sensors mounted on a plurality of vehicles traversing the portion of the environment; associating a portion of the sensor data with a voxel space representing the portion of the environment; determining a two-dimensional (2D) image representing a top-down view of the voxel space; determining, based at least in part on the 2D image and a plurality of semantic labels, a segmented image; and generating, based at least in part on the segmented image, a road network map for the portion of the environment.

H: The method of example G, wherein the portion of the sensor data corresponds to data associated with one or more of: surfaces of the portion of the environment that are at an elevation less than or equal to a vertical threshold from a ground plane, static elements of the environment, or a high confidence value.

I: The method of example G or example H, wherein: individual voxels of the voxel space correspond to a respective physical volume of the portion of the environment, and individual voxels are associated with one of: an average intensity value, a cumulative intensity value, a maximum intensity value, or a weighted average intensity value, of the sensor data associated with the respective physical volume.

J: The method of any of example G through example I, wherein the plurality of semantic labels comprises one or more road map elements on a drivable surface characterized by reflective markings.

K: The method of any of example G through example J, wherein determining the segmented image comprises: inputting the 2D image into a machine-learned (ML) model; determining, based at least in part on an output from the ML model, a confidence score associated with a segment of the segmented image; and updating, based on the confidence score being greater than a threshold, a road network map associated with the portion of the environment.

L: The method of any of example G through example K, wherein the ML model is a fully convolutional network (FCN) previously trained using training data comprising images of top-down views of road networks labeled with the plurality of semantic labels.

M: The method of any of example G through example L, further comprising: flagging, based on the confidence score being less than the threshold, the segment for verification; presenting the segment to an operator; receiving, from the operator, an input indicative of validity of the segment; and based on receiving the input, updating the road network map.

N: The method of any of example G through example M, wherein the sensor data comprises one or more of: LiDAR data or radar data.

O: The method of any of example G through example N, further comprising: transmitting the road network map to an autonomous vehicle configured to navigate the environment using the road network map.

P: An example one or more non-transitory computer-readable media storing instructions executable by a processor, wherein the instructions, when executed, cause the processor to perform operations comprising: receiving a set of sensor data representative of a portion of an environment, individual of the set of sensor data being associated with a respective voxel space at a corresponding 3D location; generating an aggregate of the set of sensor data mapped to voxels of a common voxel space; generating an image representing a two-dimensional (2D) projection of the common voxel space; inputting the image into a machine-learned (ML) model trained to output one or more semantic labels associated with pixels of an input image; determining, based on an output of the ML model, a segmented image associated with one or more semantically labeled segments; and controlling, based at least in part on the segmented image, an autonomous vehicle traversing the portion of the environment.

Q: The one or more non-transitory computer-readable media of example P, the operations further comprising: updating, based on the segmented image, a road network map of the portion of the environment, wherein the updating occurs at pre-defined intervals and is based at least in part on a difference between the segmented image and an existing road network map of the portion of the environment.

R: The one or more non-transitory computer-readable media of example P or example Q, wherein the one or more semantically labeled segments are associated with a corresponding confidence score, the confidence scores being based at least in part on the output of the ML model, and based on the confidence score being less than a threshold, the updating is further based on an input from a human operator.

S: The one or more non-transitory computer-readable media of any of example P through example R, wherein: the sensor data comprises one or more of: LiDAR data, radar data, or range data, the set of sensor data is captured by sensors mounted on a plurality of vehicles traversing the portion of the environment, and the 3D location of the respective voxel space of individual of the set of sensor data is based on localization information associated with the sensors at a time of capture of the sensor data.

T: The one or more non-transitory computer-readable media of any of example P through example S, wherein the aggregate comprises one of: an average intensity value, a cumulative intensity value, a maximum intensity value, or a weighted average intensity value of the set of sensor data.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A system comprising:
one or more processors; and
one or more non-transitory computer-readable media storing instructions executable by one or more processors, wherein the instructions, when executed, cause the system to perform operations comprising:
receiving LiDAR data representative of a portion of an environment, the LiDAR data including intensity information of LiDAR returns from the portion of the environment;
identifying a subset of the LiDAR data having an elevation greater than a threshold distance from a ground plane;
generating filtered LiDAR data excluding the subset of the LiDAR data;
associating intensity information of LiDAR returns associated with the filtered LiDAR data with a voxel space representing the portion of the environment;
determining, based on aggregated intensity information in voxels of the voxel space, image data representing a top-down view of the voxel space;
inputting the image data into a machine-learned (ML) model;
receiving, as an output of the ML model, classification information comprising a classification associated with individual pixels of the image data, wherein the classification is indicative of a road map element of a set of road map elements;
determining, based at least in part on the classification information, a segment of the image data corresponding to a first road map element of the set of road map elements, the first road map element corresponding to an element on a driving surface; and
generating, based at least in part on the segment of the image data, a road network map of the environment, wherein a vehicle is localized in the environment based at least in part on the road network map.

2. The system of claim 1, wherein:
the LiDAR data is captured during multiple traversals of the environment, at different times, by one or more additional vehicles.

3. The system of claim 1, wherein the aggregated intensity information comprises one of: cumulative intensity, maximum intensity, average intensity, or a weighted average intensity.

4. The system of claim 1, wherein the ML model comprises a fully convolutional network (FCN) previously trained using training data comprising images of top-down views of road networks wherein pixels of the images are labeled as belonging to a road map element of the set of road map elements.

5. The system of claim 1, wherein the set of road map elements includes one or more of:
a drive lane element;
a turn lane element;
a bike lane element;
a crosswalk element;
a sidewalk element;
an intersection element;
a lane divider element;
a stop line element; or
a yield line element.

6. The system of claim 1, the operations further comprising:
receiving an existing road network map for the portion of the environment, the existing road network map including an area indicative of the first road map element;
determining a confidence score associated with the segment of the image data corresponding to the first road map element;
determining, based on comparing a spatial extent of the segment with the area, that the segment does not match the area; and
updating, based at least in part on the confidence score being greater than a threshold, the area indicative of the first road map element in the road network map.

7. A method comprising:
receiving sensor data associated with a portion of an environment, wherein the sensor data is captured by LiDAR sensors mounted on a plurality of vehicles traversing the portion of the environment;
associating a portion of the sensor data comprising intensity information from the LiDAR sensors with a voxel space representing the portion of the environment;
determining, based on the intensity information, a two-dimensional (2D) image representing a top-down view of the voxel space;
determining, by providing the 2D image as input to a machine-learned (ML) model, a plurality of semantic labels associated with individual pixels of the 2D image;
determining, based at least in part on the 2D image and the plurality of semantic labels, a segmented image; and
generating, based at least in part on the segmented image, a road network map for the portion of the environment, wherein a vehicle is localized in the environment based at least in part on the road network map.

8. The method of claim 7, wherein the portion of the sensor data corresponds to data associated with one or more of:
surfaces of the portion of the environment that are at an elevation less than or equal to a vertical threshold from a ground plane,
static elements of the environment, or
a high confidence value.

9. The method of claim 7, wherein:
individual voxels of the voxel space correspond to a respective physical volume of the portion of the environment, and
individual voxels are associated with one of: an average intensity value, a cumulative intensity value, a maximum intensity value, or a weighted average intensity value, of the sensor data associated with the respective physical volume.

10. The method of claim 7, wherein the plurality of semantic labels comprises one or more road map elements on a drivable surface characterized by reflective markings.

11. The method of claim 7, further comprising:
receiving an existing road network map for the portion of the environment;
determining, based at least in part on an output from the ML model, a confidence score associated with a segment of the segmented image; and
updating, based on the confidence score being greater than a threshold, the existing road network map associated with the portion of the environment.

12. The method of claim 11, further comprising:
flagging, based on the confidence score being less than the threshold, the segment for verification;
presenting the segment to an operator;
receiving, from the operator, an input indicative of validity of the segment; and
based on receiving the input, updating the existing road network map.

13. The method of claim 11, wherein the ML model is a fully convolutional network (FCN) previously trained using training data comprising images of top-down views of road networks labeled with the plurality of semantic labels.

14. The method of claim 7, wherein the sensor data further comprises radar data or range data.

15. The method of claim 7, further comprising:
transmitting the road network map to an autonomous vehicle configured to navigate the environment using the road network map.

16. One or more non-transitory computer-readable media storing instructions executable by a processor, wherein the instructions, when executed, cause the processor to perform operations comprising:
receiving a set of sensor data representative of a portion of an environment, individual of the set of sensor data being:
associated with a respective voxel space representing the portion of the environment, and
comprising intensity information captured by LiDAR sensors mounted on a vehicle traversing the portion of the environment;
generating an aggregate of the set of sensor data mapped to voxels of a common voxel space;
generating an image representing a two-dimensional (2D) projection of the common voxel space;
inputting the image into a machine-learned (ML) model trained to output one or more semantic labels associated with pixels of an input image;
determining, based on an output of the ML model, a segmented image associated with one or more semantically labeled segments; and
generating, based at least in part on the segmented image, a road network map for the portion of the environment, wherein a vehicle is localized in the environment based at least in part on the road network map.

17. The one or more non-transitory computer-readable media of claim 16, the operations further comprising:
receiving an existing road network map for the portion of the environment; and
updating, based on the segmented image, the existing road network map of the portion of the environment,
wherein the updating occurs at pre-defined intervals and is based at least in part on a difference between the segmented image and the existing road network map of the portion of the environment.

18. The one or more non-transitory computer-readable media of claim 17, wherein the one or more semantically labeled segments are associated with a corresponding confidence score, the confidence scores being based at least in part on the output of the ML model, and
based on the confidence score being less than a threshold, the updating is further based on an input from a human operator.

19. The one or more non-transitory computer-readable media of claim 16, wherein:
the sensor data further comprises radar data or range data,
the set of sensor data is captured by a plurality of vehicles traversing the environment, and
the set of sensor data is mapped to the voxels of the common voxel space based on localization information associated with the plurality of vehicles at a time of capture of the set of sensor data.

20. The one or more non-transitory computer-readable media of claim 16, wherein the aggregate comprises one of: an average intensity value, a cumulative intensity value, a maximum intensity value, or a weighted average intensity value of the set of sensor data.

\* \* \* \* \*